US012058710B2

(12) United States Patent
Freda et al.

(10) Patent No.: US 12,058,710 B2
(45) Date of Patent: Aug. 6, 2024

(54) PROCEDURES FOR ENABLING SIMULTANEOUS TRANSMISSION OF DIFFERENT TYPES

(71) Applicant: INTERDIGITAL PATENT HOLDINGS, INC., Wilmington, DE (US)

(72) Inventors: Martino M. Freda, Laval (CA); Diana Pani, Montreal (CA); Tao Deng, Roslyn, NY (US); Tuong Duc Hoang, Montreal (CA); Aata El Hamss, Laval (CA); Chunxuan Ye, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 384 days.

(21) Appl. No.: 17/416,137

(22) PCT Filed: Dec. 19, 2019

(86) PCT No.: PCT/US2019/067550
§ 371 (c)(1),
(2) Date: Jun. 18, 2021

(87) PCT Pub. No.: WO2020/132284
PCT Pub. Date: Jun. 25, 2020

(65) Prior Publication Data
US 2022/0061055 A1 Feb. 24, 2022

Related U.S. Application Data

(60) Provisional application No. 62/784,040, filed on Dec. 21, 2018, provisional application No. 62/840,797, filed on Apr. 30, 2019.

(51) Int. Cl.
H04W 72/53 (2023.01)

(52) U.S. Cl.
CPC .................. H04W 72/53 (2023.01)

(58) Field of Classification Search
CPC ..... H04W 72/53; H04W 24/08; H04W 48/12; H04W 72/23; H04W 72/1263; H04W 28/0278; H04W 72/02; H04W 72/21
See application file for complete search history.

(56) References Cited

U.S. PATENT DOCUMENTS 9,042,324 B2    5/2015  Zhang et al.
2018/0234889 A1 8/2018  Baghel et al.
2020/0059844 A1* 2/2020 Lee .................. H04W 36/06

FOREIGN PATENT DOCUMENTS

WO  WO-2019096275 A1 *  5/2019
WO  WO-2019178843 A1 *  9/2019
WO  2020/033226           2/2020

OTHER PUBLICATIONS

Apple Inc., "QoS Handling in NR V2X," 3GPP TSG-RAN WG2 Meeting #104, R2-1817468, Spokane, USA (Nov. 12-16, 2018).
(Continued)

Primary Examiner — Yaotang Wang
(74) Attorney, Agent, or Firm — Volpe Koenig

(57) ABSTRACT

Systems, methods, and devices for enabling simultaneous transmission of different types of transmission protocols. A device such as a wireless transmit receive unit (WTRU) may receive configuration information and receive a data packet from an upper layer of a protocol stack operating on the WTRU. The WTRU may then determine a transmission type for the data packet at a first time based on the configuration information and a condition. The WTRU may then transmit the data packet using the determined transmission type. The configuration information may include decision criteria associated with determining the transmission type and a set
(Continued)

of logical channels that are associated with data properties. The transmission type may be one of a network scheduled mode, WTRU autonomously scheduled mode, LTE, NR, unicast, groupcast, or broadcast.

12 Claims, 7 Drawing Sheets

(56) References Cited

OTHER PUBLICATIONS

ETSI MCC, "Report of 3GPP TSG RAN2#104 meeting, Spokane, USA," 3GPP TSG-RAN WG2 meeting #105, R2-1900002 (Feb. 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "RAN2 Aspects and TP for Simultaneous Support of Mode 1 and Mode 2," 3GPP RAN WG2 Meeting #105, R2-1901578, Athens, Greece (Feb. 25-Mar. 1, 2019).
Interdigital Inc., "RAN2 Aspects of Simultaneous Configuration of Mode 1 and Mode 2," 3GPP RAN WG2 Meeting #106, R2-1906389, Reno, USA (May 13-17, 2019).
Lenovo et al., "Discussion on QoS management for NR V2X," 3GPP TSG-RAN WG2 Meeting #104, R2-1817118, Spokane, USA (Nov. 12-16, 2018).
Qualcomm Incorporated, "Design aspects and requirements for QoS," 3GPP TSG-RAN WG1 Meeting #94bis, R1-1811267, Chengdu, China (Oct. 8-12, 2018).
Third Generation Partnership Project, "Technical Specification Group Services and System Aspects; Study on enhancement of 3GPP Support for 5G V2X Services (Release 16)," 3GPP TR 22.886 V16.2.0 (Dec. 2018).
Third Generation Partnership Project, "Technical Specification Group Services and System Aspects; Study on enhancement of 3GPP Support for 5G V2X Services (Release 16)," 3GPP TR 22.886 V16.0.0 (Jun. 2018).
Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).
Third Generation Partnership Project, "Technical Specification Group Services and System Aspects; Enhancement of 3GPP support for V2X scenarios; Stage 1 (Release 15)," Technical Specification Group Services and System Aspects; Enhancement of 3GPP support for V2X scenarios; Stage 1 (Release 15), 3GPP TS 22.186 V15.4.0 (Sep. 2018).
Third Generation Partnership Project, "Technical Specification Group Services and System Aspects; Enhancement of 3GPP support for V2X scenarios; Stage 1 (Release 15)," 3GPP TS 22.186 V15.3.0 (Jun. 2018).
Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).
Third Generation Partnership Project, "Technical Specification Group Services and System Aspects; Proximity-based services (ProSe); Stage 2 (Release 15)," 3GPP TS 23.303 V15.1.0 (Jun. 2018).
Third Generation Partnership Project, "Technical Specification Group Services and System Aspects; Architecture enhancements for V2X services (Release 15)," 3GPP TS 23.285 V15.3.0 (Mar. 2019).
Third Generation Partnership Project, "Technical Specification Group Services and System Aspects; Architecture enhancements for V2X services (Release 16)," 3GPP TS 23.285 V16.0.0 (Mar. 2019).
Third Generation Partnership Project, "Technical Specification Group Services and System Aspects; Architecture enhancements for V2X services (Release 15)," 3GPP TS 23.285 V15.1.0 (Jun. 2018).
Third Generation Partnership Project, "Technical Specification Group Services and System Aspects; System Architecture for the 5G System; Stage 2 (Release 15)," 3GPP TS 23.501 V15.2.0 (Jun. 2018).
Third Generation Partnership Project, "Technical Specification Group Services and System Aspects; Study on architecture enhancements for EPS and 5G System to support advanced V2X services (Release 16)," 3GPP TR 23.786 V0.8.0 (Aug. 2018).
Third Generation Partnership Project, "Technical Specification Group Services and System Aspects; Study on architecture enhancements for the Evolved Packet System (EPS) and the 5G System (5GS) to support advanced V2X services (Release 16)," 3GPP TR 23.786 V16.1.0 (Jun. 2019).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.2.0 (Jun. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.6.0 (Jun. 2019).
Third Generation Partnership Project, "Technical Specification Group Radio Access Network; Study on Scenarios and Requirements for Next Generation Access Technologies; (Release 15)," 3GPP TR 38.913 V15.0.0 (Jun. 2018).
Third Generation Partnership Project, "Technical Specification Group Services and System Aspects; System Architecture for the 5G System; Stage 2 (Release 16)," 3GPP TS 23.501 V16.1.0 (Jun. 2019).
Third Generation Partnership Project, "Technical Specification Group Services and System Aspects; System Architecture for the 5G System; Stage 2 (Release 15)," 3GPP TS 23.501 V15.5.0 (Mar. 2019).
Third Generation Partnership Project, "Technical Specification Group Services and System Aspects; Study on architecture enhancements for EPS and 5G System to support advanced V2X services (Release 16)," 3GPP TR 23.786 V0.7.0 (Jul. 2018).
Vodafone, "New SID: Study on NR V2X," 3GPP TSG RAN Meeting #80, RP-181429, La Jolla, USA (Jun. 11-14, 2018).
ZTE, "Discussion on LCP procedure for PC5 CA," 3GPP TSG-RAN WG2 Meeting #101bis, R2-1804509, Sanya, China (Apr. 16-20, 2018).

(56) References Cited

OTHER PUBLICATIONS

Huawei, Summary of [103bis#37][NR/V2X]—NR sidelink design, CP aspects, 3GPP RAN WG2 Meeting #104, R2-1816515, Spokane, USA (Nov. 12-16, 2018).

Interdigital, Inc., "Resource Allocation Features to Support NR V2X Requirements," 3GPP RAN WG2 Meeting #104, R2-1816788, Spokane, USA (Nov. 12-16, 2018).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.3.0 (Sep. 2018).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.7.0 (Sep. 2019).

* cited by examiner

PROCEDURES FOR ENABLING SIMULTANEOUS TRANSMISSION OF DIFFERENT TYPES

CROSS-REFERENCE TO RELATED APPLICATIONS

This application is the U.S. National Stage, under 35 U.S.C. § 371, of International Application No. PCT/US2019/067550, filed Dec. 19, 2019, which claims the benefit of U.S. Provisional Application No. 62/784,040, filed Dec. 21, 2018 and U.S. Provisional Application No. 62/840,797 filed Apr. 30, 2019, the contents of which are incorporated herein by reference.

BACKGROUND

As wireless capabilities advance, there may be interconnected systems that join multiple use cases to further enhance the communication and sharing of information. For example, vehicle to everything (V2X) may be utilized to wirelessly connect devices involved in transportation, and the environments surrounding transportation infrastructure. As these systems develop, so must the protocols and procedures for wireless device interaction.

SUMMARY

Systems, methods, and devices for enabling simultaneous transmission of different types of transmission protocols. A device such as a wireless transmit receive unit (WTRU) may receive configuration information and receive a data packet from an upper layer of a protocol stack operating on the WTRU. The WTRU may then determine a transmission type for the data packet at a first time based on the configuration information and a condition. The WTRU may then transmit the data packet using the determined transmission type. The configuration information may include decision criteria associated with determining the transmission type and a set of logical channels that are associated with data properties. The transmission type may be one of a network scheduled mode, WTRU autonomously scheduled mode, LTE, NR, unicast, groupcast, or broadcast.

BRIEF DESCRIPTION OF THE DRAWINGS

Furthermore, like reference numerals in the figures indicate like elements, and wherein.

DETAILED DESCRIPTION

Figure 1A:
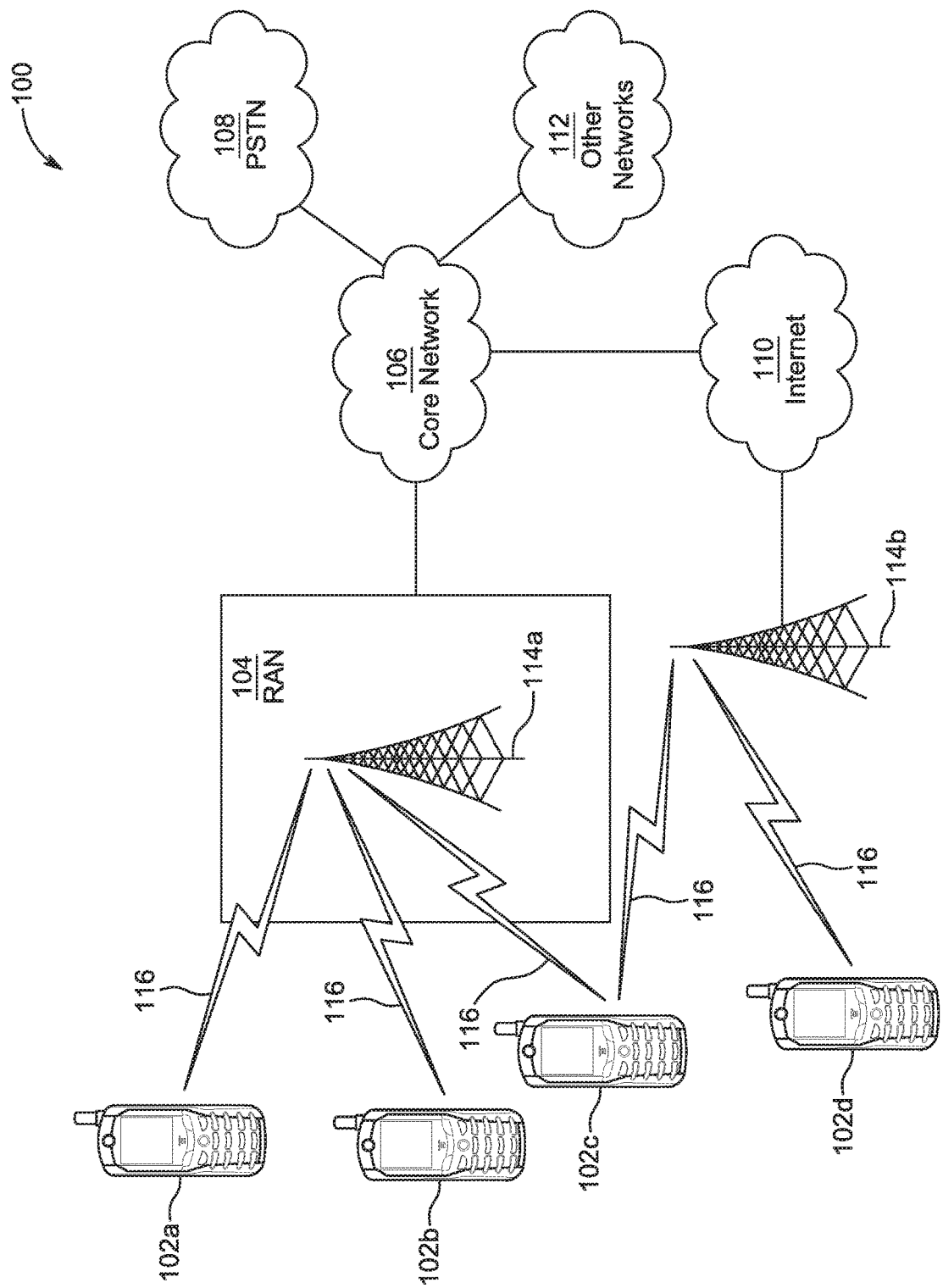
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
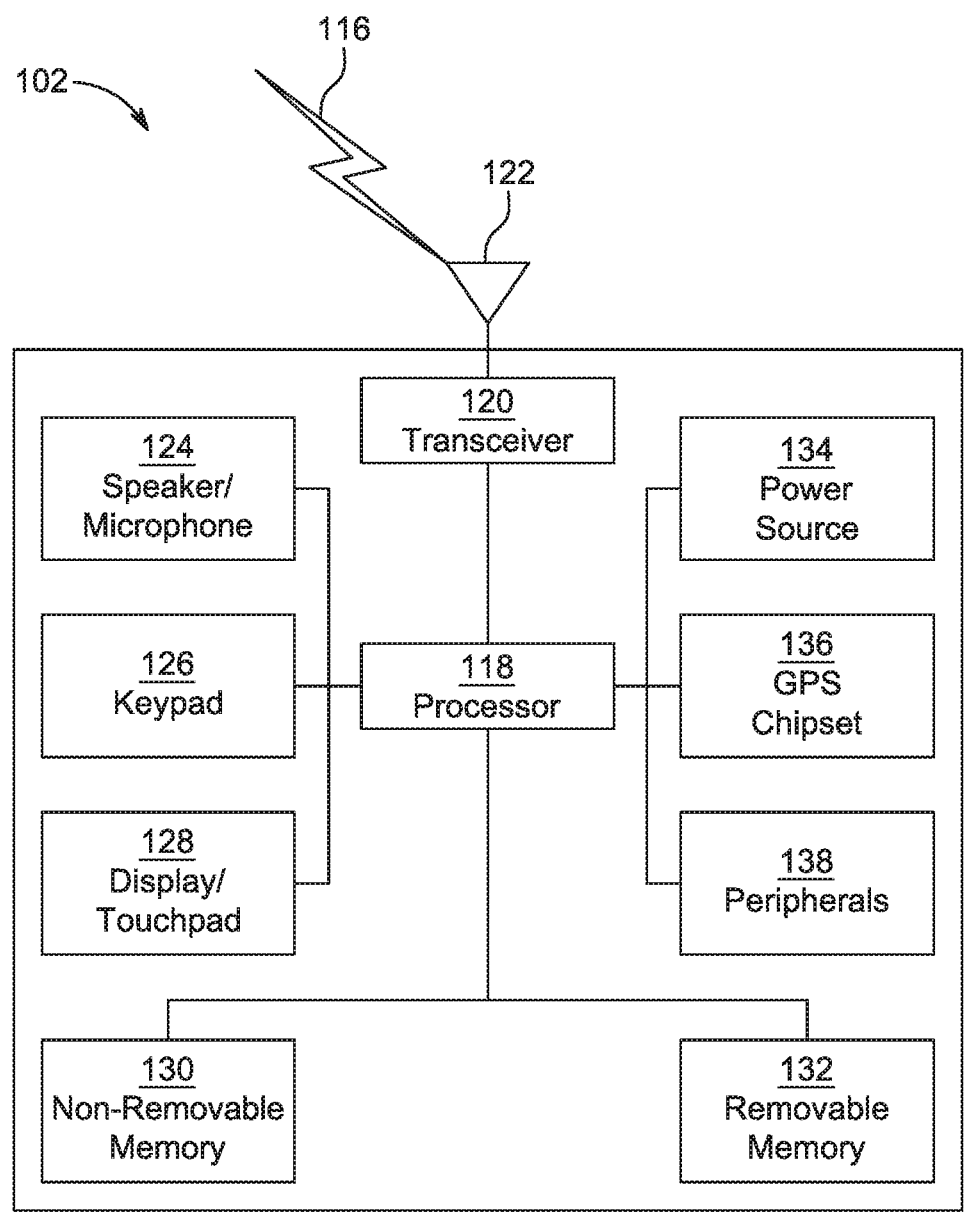
FIG. 1B is a system diagram illustrating an example wireless transmit/receive unit (WTRU) that may be used within the communications system illustrated in FIG. 1A according to an embodiment.
Figure 1C:
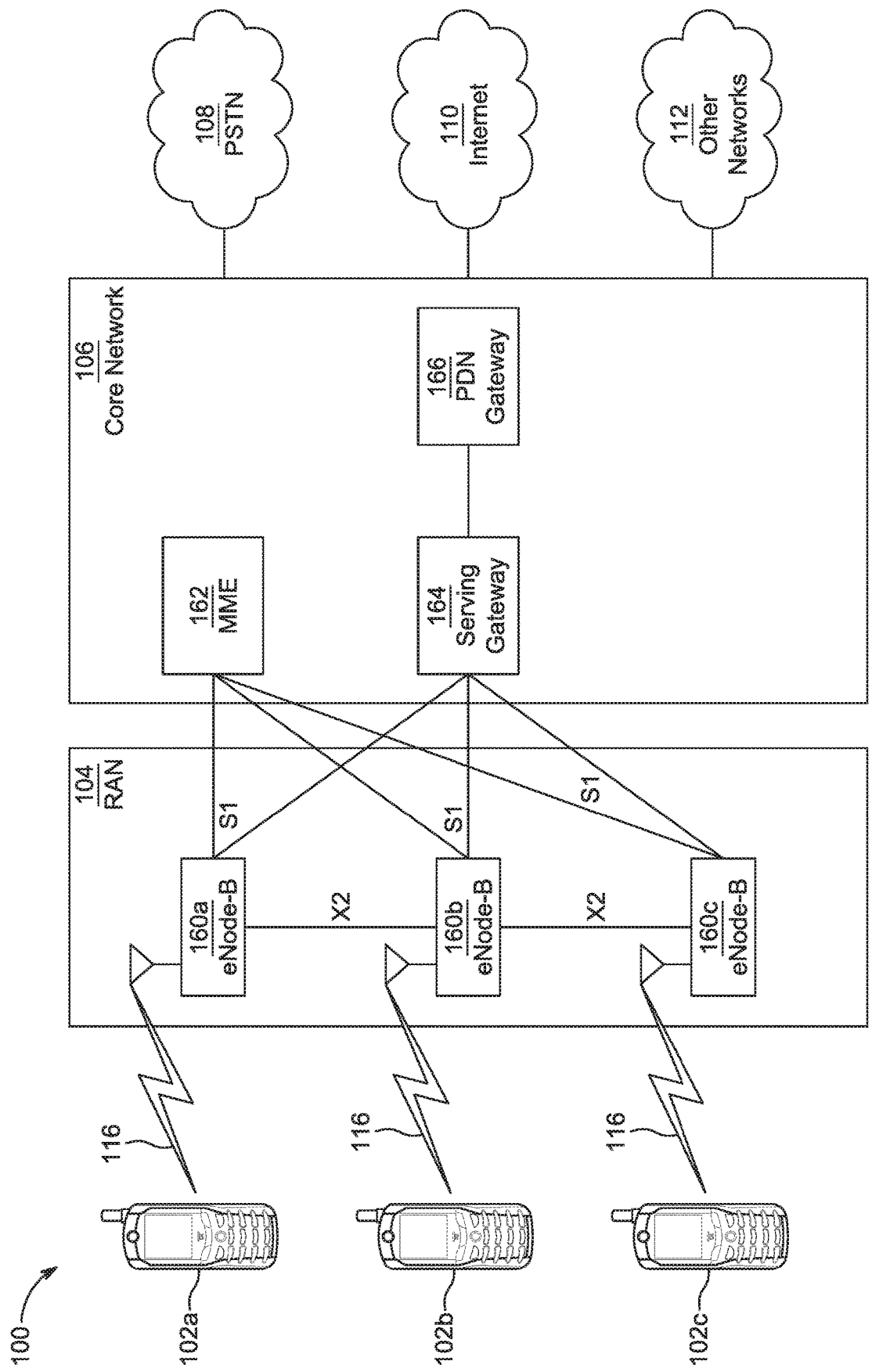
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the VVTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
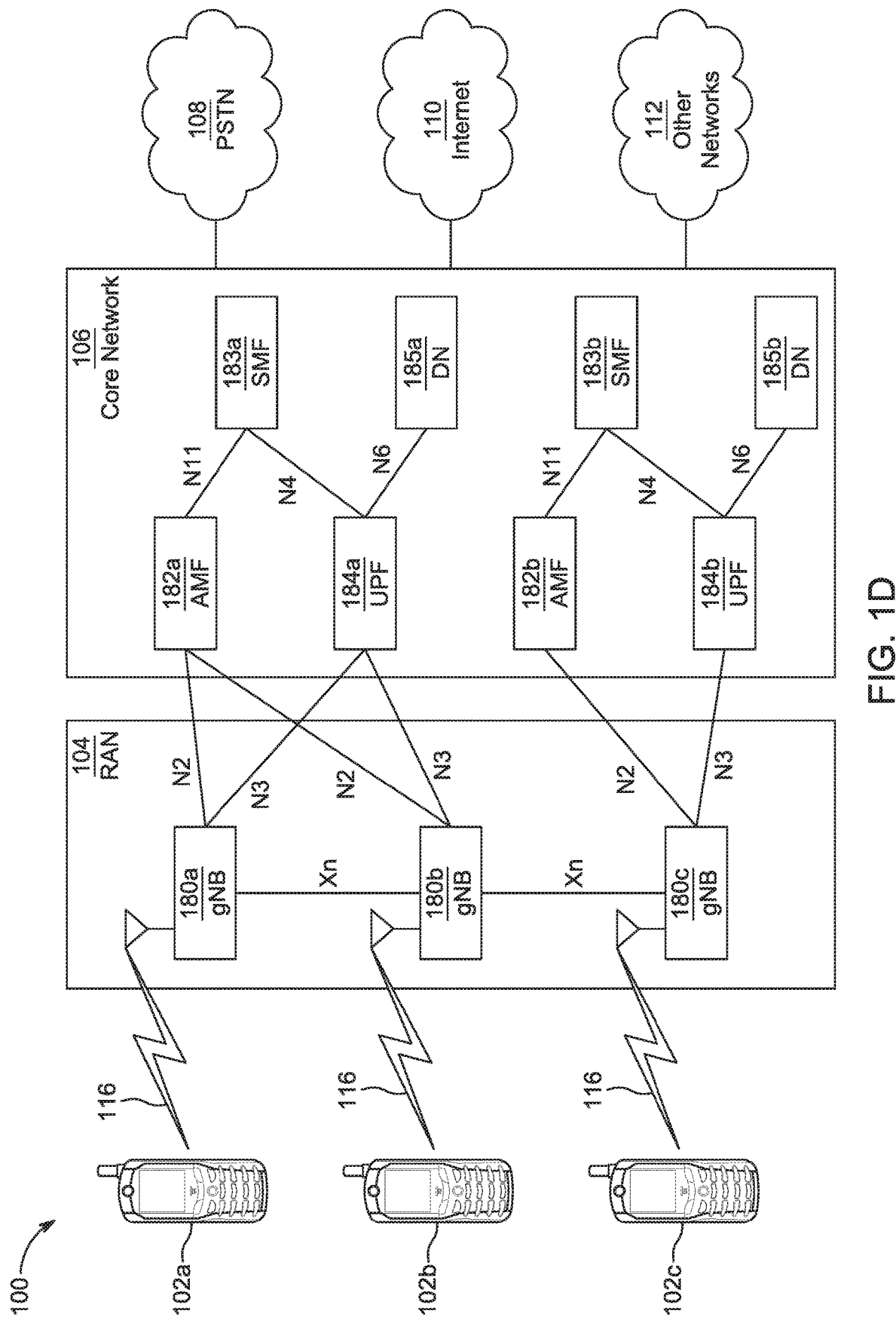
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

[Begin 14596 Disclosure]

Vehicular communication, also known as Vehicle to Everything (V2X) is a mode of communication whereby vehicles (e.g., truck, car, etc.) may communicate with each other directly and/or with the surrounding infrastructure (e.g., Road Side Unit (RSU)). As disclosed herein, a vehicle may be associated with, integrated with, and referred interchangeably with a WTRU. There may be two scenarios for V2X operations: in-coverage scenario, where WTRUs receive assistance from the network to start transmitting and receiving V2X messages; and/or out of coverage scenario, where WTRUs use some pre-configured parameters to start transmitting and receiving V2X messages.

V2X communication may be related to work done with Device-to-Device (D2D) communications. V2X communication services may involve at least four different types of interaction: Vehicle to Vehicle (V2V), where vehicular WTRUs can communicate with each other directly; Vehicle to Infrastructure (V2I), where vehicular WTRUs can communicate with RSUs/eNBs; Vehicle to Network (V2N), where vehicular WTRUs can communicate with core network; and Vehicle to Pedestrian (V2P), where vehicular WTRUs can communicate with pedestrian (e.g., non-vehicular) WTRUs with special conditions (e.g., low battery capacity).

There are several modes of operation that relate to V2X resource allocation. In LTE, there may at least two modes of operation in V2X communication. mode 3 is where the network gives the WTRU a scheduling assignment for V2X sidelink transmission. mode 4 is where the WTRU autonomously select the resources from a configured/pre-configured resource pool. In addition to the modes, V2X LTE may comprise at least two categories of resource pools: receiving pools, which are monitored for receiving V2X transmission, and V2X transmitting pools, which are used by WTRUs to select the transmission resource in mode 4. Transmitting pools may not be used by WTRUs configured in mode 3.

In LTE, the resource pools may be semi-statically signaled to WTRUs via RRC signaling. In mode 4, the WTRU may use sensing before selecting a resource from the RRC configured transmitting pool. In some cases, LTE V2X may not support dynamic resource pool reconfiguration, and pool configuration may only be carried via SIB and/or dedicated RRC signaling.

New Radio (NR) may be considered a "next generation" wireless system. NR systems may support a number of use cases such as enhanced Mobile Broadband (eMBB), ultra-high reliability, and/or low latency communications (URLLC).

Enhanced V2X (eV2X) communication may be a part of NR systems. eV2X in NR may support new services for both safety and non-safety scenarios (e.g., sensor sharing, automated driving, vehicle platooning, remote driving). Different eV2X services may require different performance requirements (e.g., 3 ms latency may be required).

NR V2X may support new use cases, such as vehicle platooning, advanced driving, extended sensors, remote driving, and the like.

Vehicles Platooning may enable vehicles to dynamically form a group traveling together. All the vehicles in the platoon may receive periodic data from the leading vehicle, in order to carry out platoon operations. This information may allow the distance between vehicles to become extremely small (e.g., the gap distance translated to time may be very low, such as sub second). Platooning applications may allow the vehicles following to be autonomously driven.

Advanced Driving may enable semi-automated or fully-automated driving. For this use case, longer inter-vehicle distance may be assumed. Each vehicle and/or Road Side Unit (RSU) may share data obtained from its local sensors with vehicles in proximity, thus allowing vehicles to coordinate their trajectories or maneuvers. In addition, each vehicle may share its driving intention with vehicles in proximity. Some benefits of this use case may be safer traveling, collision avoidance, and/or improved traffic efficiency.

Extended Sensors may enable the exchange of raw or processed data gathered through local sensors or live video data among vehicles, RSUs, devices of pedestrians, and V2X application servers. The vehicles may enhance the perception of their environment beyond what their own sensors can detect and have a more holistic view of the local situation.

Remote Driving may enable a remote driver or a V2X application to operate a remote vehicle for those passengers who cannot drive themselves, or a remote vehicle located in dangerous environments. For a use case where variation is limited and routes are predictable, such as public transportation, driving based on cloud computing or remote operation may be implemented. In addition, access to a cloud-based back-end service platform may be considered for this use case.

Both LTE and NR may be Radio Access Technologies (RATs) that supporting eV2X. NR V2X may complement LTE V2X for advanced V2X services and support inter-working with LTE V2X. A WTRU may therefore need to support both NR and LTE sidelink operation simultaneously.

LTE V2X may support both NW scheduled mode (mode 3) and WTRU autonomous mode (mode 4). NR V2X may also support both NW scheduled mode (mode 1) and WTRU autonomous mode (mode 2). Furthermore, There may also be submodes for mode 2 for V2X, such as: mode 2a, where the WTRU autonomously selects sidelink resources for transmission; mode 2c, where the WTRU is configured with NR configured grant (type-1 like) for sidelink transmission; and/or mode 2d, where a WTRU schedules sidelink transmissions of other WTRUs. Mode 2b-like behavior may also be an option for functionality that could be built into any of the other modes. For mode 2b, a WTRU may assist sidelink resource selection for other WTRUs.

In some situations, LTE V2X may serve as a broadcast mechanism at the Access Stratum (AS) layer. A V2X WTRU may be provided with an L2 destination ID from the upper layers that correspond to a V2X service. The WTRU may include the L2 destination ID in the MAC header, and reception may be based on a WTRU filtering MAC PDUs having an L2 destination ID that matches the services the WTRU is interested in.

For NR V2X, there may be more stringent requirements combined with use cases (e.g., platooning) that motivates the use of unicast and groupcast transmissions as well. With unicast and groupcast transmission, a WTRU may take advantage of feedback from the receiver (e.g., HARQ, CQI) to optimize the transmission power, retransmissions, and the like, to allow more efficient use of resources and better control of QoS.

There may be a QoS model for NR V2X. QoS over PC5 may be supported with ProSe Per-Packet Priority (PPPP). The application layer may be allowed to mark the packets with the PPPP, which indicates the required QoS level. Certain enhancements may be added, such as deriving the Packet Delay Budget (PDB) from the PPPP.

There may be additional features to QoS for NR. These additional features may have key performance indicators with one or more of the following parameters (and their units): payload (bytes); transmission rate (message/sec); maximum end-to-end latency (ms); reliability (%); data rate (Mbps); and/or minimum required communication range (meters).

The same set of service requirements may apply to both PC5 based V2X communication and Uu based V2X communication. Consequently, there may be a unified QoS model for PC5 and Uu (e.g., also using 5QIs for V2X communication over PC5), such that the application layer may have a consistent way of indicating QoS requirements regardless of the link used.

Considering 5GS V2X capable WTRUs, there may be at least three different types of traffic: broadcast, multicast, and unicast.

For the unicast type of traffic, the same QoS Model as that of Uu may be utilized (e.g., each of the unicast links may be treated as a bearer and QoS flows may be associated with it). All the QoS characteristics defined in 5QI and the additional parameter of data rate may also apply. In addition, the minimum required communication range may be treated as an additional parameter specifically for PC5 use. Similar considerations may also apply to multicast traffic, as it may be treated as a special case of unicast (e.g., with multiple defined receivers of the traffic). For broadcast traffic, there may be no bearer concept; therefore, each message may have different characteristics according to the application requirements. The 5QI may then be used in the similar manner as that of the Prose Per Packet Priority/Prose Per Packet Reliability (PPPP/PPPR) (e.g., to be tagged with each packet). 5QI may be able to represent all the characteristics needed for the PC5 broadcast operation (e.g., latency, priority, reliability, etc.). A group of V2X broadcast specific 5QIs (e.g., Voice Quality Index (VQI)s) may be defined for PC5 use.

In one or more use cases, such as those discussed herein, a WTRU may need to carry out simultaneous operations; operations as discussed herein may refer to one or more operation carried out by the WTRU, such as transmitting, receiving, processing, determining, carrying out a mode of operation, etcetera. These operations may include handling one or more transmission types, such as a WTRU handling simultaneous transmission types, depending on the circumstances. Transmission types, as discussed herein, may refer to, but is not limited to: transmission mode, such as a WTRU autonomous or NW scheduled modes (e.g., mode 3, mode 4 for LTE, or mode 1, mode 2 for NR), and/or submodes of mode 2 for NR (e.g., mode 2a, mode 2c, mode 2d); Sidelink Radio Access Technology (SL RAT), such as where a WTRU may transmit over NR SL RAT or LTE SL RAT; cast type, such as where an NR V2X WTRU may transmit using unicast, groupcast, or broadcast transmission. Combinations of these transmission types (e.g., mode 2 on NR SL RAT vs mode 3 on LTE SL RAT) may themselves also be considered as separate modes.

In one or more embodiments, there may be simultaneous operation in mode 1 and mode 2. In LTE V2X, a WTRU may only be configured with either mode 3 or mode 4 based on a NW decision. Specifically, a WTRU may perform mode 4 resource selection in RRC_IDLE if the system information contains the required V2X resource pools. Otherwise, the WTRU may be forced to initiate an RRC connection and the NW can provide the pools and allow the WTRU to operate in mode 4, or the WTRU is provided scheduling in mode 3. If the WTRU operates in mode 1 and mode 2 simultaneously, the WTRU may either use NW grants, or grants from resource selection to transmit buffered data. Procedures may be required at the WTRU to determine which data should be sent over mode 1 or mode 2. Mode 2 resource selection rules may need to take into account the availability of NW resources, while interaction with the network for mode 1 (e.g., BSR reporting) may also need to take into account the availability of mode 2 resources at the WTRU. Approaches for addressing simultaneous operation in mode 1 and mode 2 may be discussed herein.

In one or more embodiments, there may be simultaneous Operation in LTE and NR Side Link (SL). A WTRU may need to operate over both LTE and NR SL simultaneously. While some packets may be tagged by upper layers as required for transmission on LTE or NR (e.g., for reasons of backward compatibility or stringent QoS requirements), other packets may be allowed on either RAT. For such packets, procedures may be required at the WTRU to select the appropriate RAT that manages the load of each RAT and ensures that the packet gets transmitted while respecting its QoS. Approaches for addressing simultaneous operation in LTE and NR SL may be discussed herein.

In one or more embodiments, there may be simultaneous operation in unicast, groupcast, broadcast. A WTRU may receive packets from the upper layers that are associated with a unicast, or groupcast, link (e.g., packets intended to a unique WTRU) as well as packets associated with broadcast transmissions (e.g., packets associated with a L2 destination ID monitored by multiple WTRUs). Given that any of the cast types may operate using mode 1 or mode 2, resource allocation may need to be performed in consideration of the two modes. Specifically, the NW may need to be aware of the amount of data buffered for each cast type for operation in mode 1. In addition, resource and carrier selection may allow a common set of resources for each cast type to avoid segregation of resources. Approaches for addressing simultaneous operation in unicast, groupcast, and broadcast may be discussed herein.

When dealing with embodiments that address simultaneous WTRU operations, one issue that may arise is how to select a transmission type for data in different circumstances. To address this issue, there may be more than one model of the layer 2 structure for simultaneous use of transmission types, as well as decision criteria and WTRU actions for the selection of transmission types.

When discussing various models in connection with simultaneous use of transmission types, each model described herein is presented as an example, and it is intended that features from one model or example may be applicable to another model or other described circumstances. The numbers associated with the models are merely to provide reference to particular examples and are not intended to offer any meaning as to a preferred approach.

Figure 2:
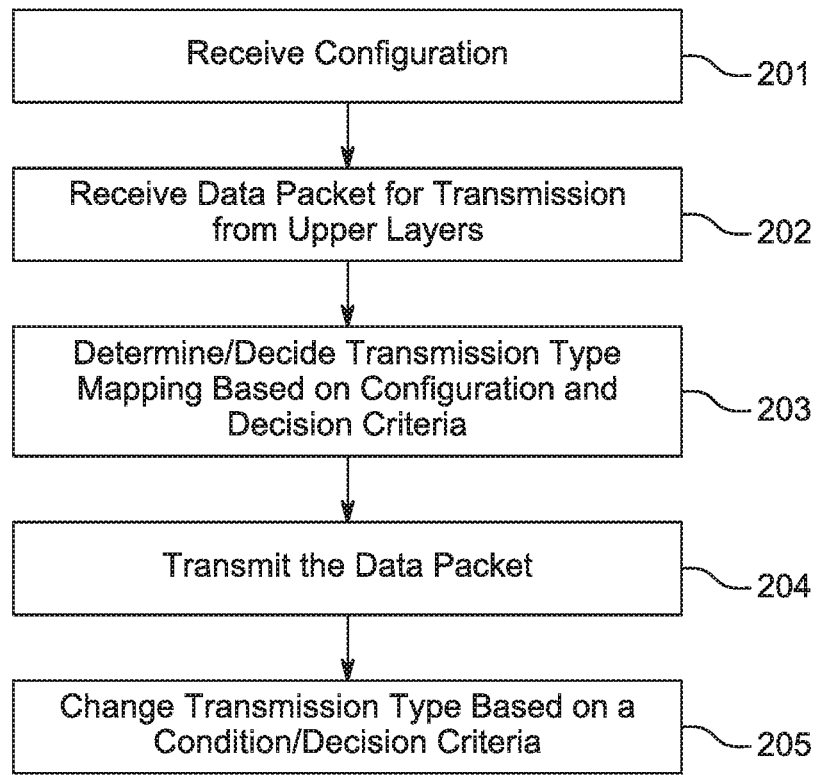
FIG. 2 is a flow chart illustrating an example process of data packet handling for a transmission.

FIG. 2 is a flow chart showing an example procedure of selecting transmission types for data. Each model described herein, may carry out all or some of the procedure shown in the figure. Generally, for any model a WTRU may first receive a configuration 201 which contains configuration information or settings that the WTRU can use to determine or decide the transmission type appropriate for a given situation. The configuration may come from the network via an appropriate device (e.g., base stations such as a gNB, eNB, etc.). As part of the normal operation of a WTRU, data may be received from an upper layer 202 (e.g., received at a lower level in a stack of protocol layers operating on the WTRU), where the data may be one or more data packets for transmission. The WTRU may determine or decide 203 a transmission type that is appropriate for the received data packet based on the received configuration information and other decision criteria. The determination/decision process may be further described herein. The WTRU may then transmit the data packet using the appropriate transmission type 204. At some point, the WTRU may change the transmission type based on a condition (e.g., a condition change measured by the WTRU, a condition received from the network such as a new configuration, or a condition such as an event, etc.) and/or a decision criteria 205. During the example process of FIG. 2, the WTRU may be in communication with another WTRU(s) (e.g., sidelink) and/or with the network (e.g., base station), and may communicate scheduling request(s) (SR) and/or buffer status report(s) (BSR) in order to further facilitate the process. Additionally, the WTRU may carry out a carrier/resource selection process based on the conditions and/or simultaneous transmission types.

In a first model, there may be a fixed logical channel to transmission type mapping. A logical channel may be created by the WTRU, or the network may be associated with only a single transmission type. Within each transmission type, a WTRU may create a number of logical channels that may each be associated with different QoS requirements and/or different destination ID. This mapping may be part of the configuration information received by the WTRU at 201. For example, a WTRU may create a logical channel for transmission of data on LTE RAT or it may create a logical channel for transmission of data on NR RAT. In another example, a WTRU may create a logical channel for transmission of data using mode 1, or it may create a logical channel for transmission of data using mode 2. In another example, a WTRU may create a logical channel for transmission of unicast data. A WTRU may create separate logical channels for unicast transmissions to different destination WTRUs.

In the first model, a WTRU may receive a data packet for transmission from upper layers, just as at 202. Based on the decision criteria described herein, the WTRU may decide to send the data packet to a logical channel associated with one transmission type or another transmission type, just as at 203. In such a case, the decision may be taken by the WTRU at the arrival of the packet from the upper layers.

A WTRU may receive a packet for which it decides to use transmission type x, but may not have an appropriate logical channel active for transmission type x. In such a case, the WTRU may create a new logical channel associated with mode x. Alternatively, or in conjunction, the WTRU may indicate the need to create a new logical channel from the network, for example, by transmission of a MAC CE, RRC message, or Uu PHY channel transmission (e.g., SR, PUCCH, etc.). This determination and creation of a new logical channel may occur at 203.

A WTRU may decide to create/remove a logical channel associated with a transmission type based on any of the following: one of the decision criteria as discussed herein, is satisfied and there is either no logical channels present for a transmission type (e.g., creation of logical channel), or the criteria is such that all data will be transmitted using only a single transmission type (removal of logical channel); some type of data (e.g., a specific QoS or VQI) for which there is a logical channel associated with a transmission type can no longer be mapped to that transmission type (e.g., removal of logical channel); the WTRU does not receive packets, which it maps to a certain transmission type as discussed herein, for a (pre)configured period of time; and/or informed/reconfigured by the network. This creation/removal of a logical channel may occur at either 203 or 205, depending on the circumstances that prompts the change.

In a second model, a WTRU may move a logical channel from one transmission type to another. This model may be used in conjunction with the first model of fixed logical channel to transmission type. Here, a logical channel may be configured to be one transmission type only for a given period of time, such as at 205 where the transmission type may change, or such as at 203 where a transmission type may change based on a parameter associated with the received data packet. A WTRU may decide to move a logical channel from one transmission type to another, for example based on the criteria discussed herein. In this model, the decision for which transmission mode to be used for transmission of a specific data packet may be made at the time of arrival of the data from upper layers (e.g., where new data arrival forces change of a logical channel from one transmission type to another transmission type), or it may be made based on current and future packets periodically, or based on some events triggered at the WTRU and defined by the criteria as discussed herein (e.g., measurement satisfies some criteria, etc.).

For example, in the case of mode 1/mode 2, the WTRU may create or be configured with a set of logical channels that use only mode 1, and logical channels that use only mode 2. Additionally, the WTRU may create or be configured with logical channels that may use one single resource selection mode (mode 1 or mode 2) at a given time, but that can be changed from one mode to another. A WTRU may be configured with a mapping of data (e.g., based on QoS) to logical channel. Additionally, the WTRU may periodically, or based on triggers received from lower layers, decide to move one or more logical channel from transmission using one transmission type to another transmission type.

A WTRU may be configured with a maximum number of such logical channels that it can change from one transmission type to another transmission type. A WTRU may further be configured with an interval or period during which a logical channel can change its transmission type. Specifically, the WTRU may perform decision criteria evaluation for each such "movable" logical channel (e.g., based on the criteria in discussed herein) only at the defined periods. A WTRU may further use the information available over the last change interval in order to decide the transmission type for a logical channel.

A WTRU in this model may apply the decision criteria defined herein for logical channel transmission type switching only for the QoSNQI that is mapped to this logical channel, rather than simply the QoSNQI of a specific data packet. Specifically, a WTRU may be configured to create a logical channel for each VQI or set of VQIs. The WTRU may apply a decision defined herein that is dependent on the type of data or QoS by considering only the QoS/VQI which are mapped to this logical channel.

In a third model, a logical channel may be associated with multiple transmission modes. This model may be used in conjunction with the first modeling of fixed logical channel to transmission type. Here, a logical channel may be configured with multiple transmission modes. In such a modeling, the WTRU may determine the specific transmission mode to be used at the time of transmission of the data, such as at 204, and perhaps not at the reception of the data from upper layers, contrastingly.

For example, in the case of LTE and NR RAT, a WTRU may create or be configured with a set of logical channels that are sent over LTE RAT, and a set of logical channels that are set over NR RAT, just as at 201. A WTRU may further be configured with or create one or more logical channels that are associated with both RATs. In such an example, the WTRU may receive packets from upper layers, just as at 202, and send such packets to the LTE RAT or the NR RAT logical channels based on decision criteria described herein. Additionally, a WTRU may decide to send certain packets to a logical channel mapped to both LTE and NR RATs. The mapping of the actual data to logical channel may then be performed at transmission time, such as at 204.

Figure 3:
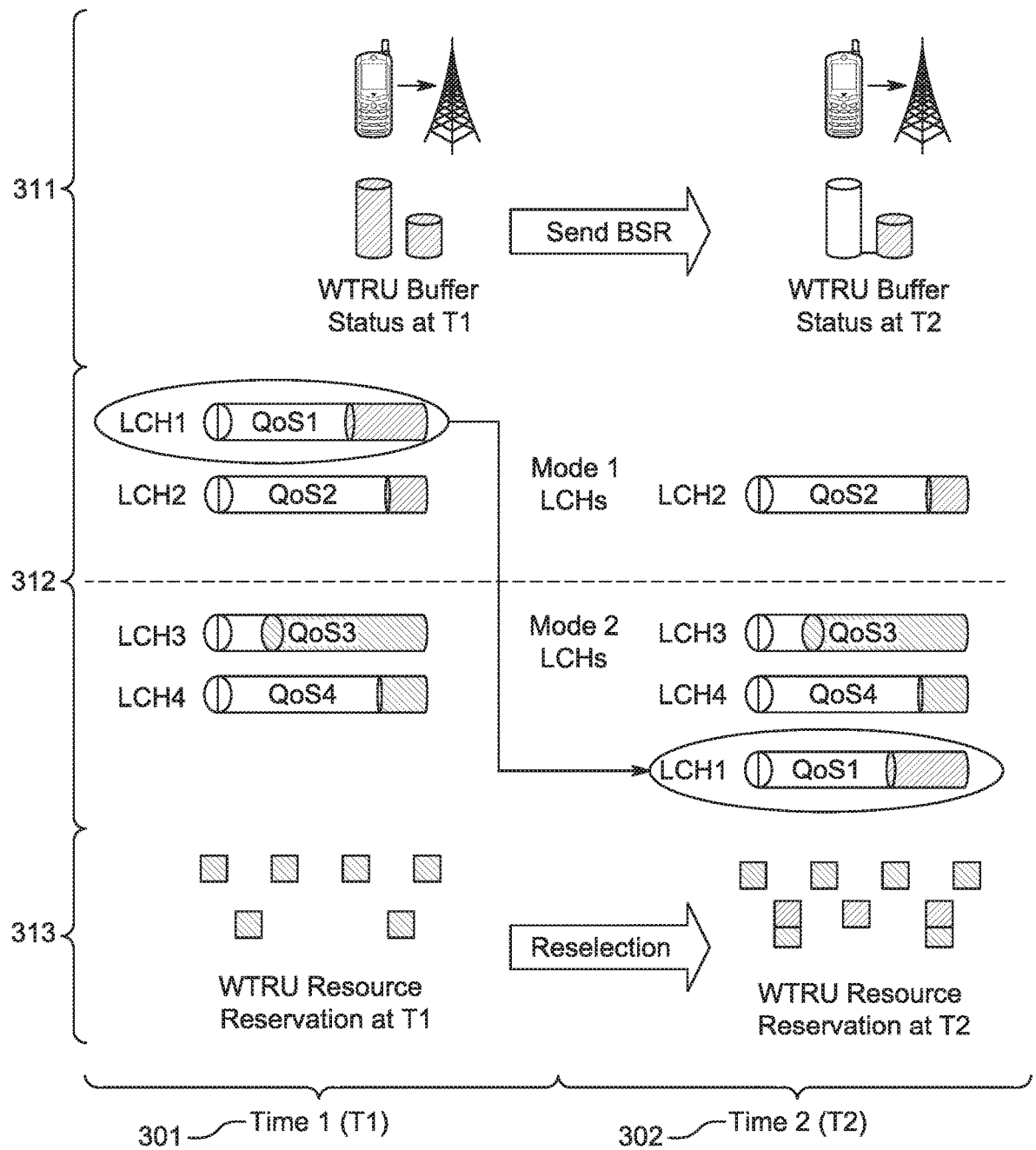
FIG. 3 is a diagram illustrating an example process of data packet handling when a condition changes.

FIG. 3 is a diagram illustrating an example of data handling when a condition changes. In this example, a WTRU may be handling different transmission types, such as Mode 1 and Mode 2. Time moves forward horizontally, where 301 time T1 and 302 time T2 are shown to distinguish between two different points in time. In a generic transmission situation for a WTRU, the WTRU may be configured with a set of logical channels (e.g., LCH1-4). The WTRU may be instructed to, or may decide on its own, to assign the logical channels to a transmission type. In the middle section 312, the example shows where logical channels LCH1 and LCH2 are associated with Mode 1 at T1, and logical channels LCH3 and LCH4 are associated with Mode 2 at T1. Data packets may be received from an upper layer and assigned to a logical channel based on decision criteria related to transmission type. At some point in time at or between T1 and T2, some condition (e.g., change in radio conditions) may prompt the WTRU to change the transmission type assigned to a logical channel, such as shown at 312 where the logical channel LCH1 is changed to Mode 2 at T2. This figure may be further explained herein.

In order to determine the transmission type for data in simultaneous WTRU operations, there may be conditions and/or decision criteria and WTRU actions for the selection of a transmission type. A WTRU may select a transmission type for sidelink data based on one or more (e.g., a combination) of the factors listed in Table 1. The criteria listed may also be considered to be a conditions, wherein a condition may have a parameter associated with it.

| Criteria | Example(s) of the criteria |
| --- | --- |
| Properties of the data to be transmitted | QoS of the data (latency, reliability, etc.) |
| Frequency/periodicity | whether the data is periodic or not, like the period of the transmission |

-continued

| Criteria | Example(s) of the criteria |
| --- | --- |
| Size of the transmission | the average/maximum size of a transmission |
| Availability of adequate resources for a given transmission mode | availability of a grant, size of an available grant, size of configured resource pools, possibly within a certain time budget, possibly in relation with the properties or amount of data |
| Network configuration, (pre)configuration, or indication | based on preferences of data to transmission type configured by the network based on dynamic signaling in the DCI where the indication, and the data subject to transmission using a different type may further be related to the amount of data requested by the WTRU versus the amount of data granted to the WTRU |
| Coverage situation of the WTRU(s) involved | based on whether the WTRU(s) are in coverage, out of coverage, in partial coverage, or in coverage of a common gNB, PLMN, area, etc. |
| Service type | mapping of transmission type to destination address |
| Load or estimated transmission quality associated with one or more transmission modes | measurements and/or comparison of channel occupancy on one or both transmission mode(s) |
| Uu RRC state and/or error conditions, or status of certain RRC timers running at the WTRU | WTRU detects RLF |
| WTRU location, velocity, direction, and/or distance with another WTRU | depending on WTRU speed or WTRU location, and possibly relative to another WTRU |
| Selection of one transmission mode determining the use of another transmission mode(s) | unicast transmissions may be configured to always use mode 1 |
| Resources, carrier, BWP, and/or similar selection for transmission by the WTRU, and determined by restriction of transmission mode that can be used on each of these selections | a specific carrier may be configured for an LTE RAT, and the WTRU may use that carrier for SL LTE in that case |
| Amount of traffic currently active that is restricted to use by one transmission type or another | based on the amount of data in the buffers associated with transmission on LTE only or NR only, as determined by upper layers |

These criteria are not intended to be an exhaustive list, but may generally representative of the type and nature of criteria that may be useful in certain situations for determining selection of a transmission type.

For the criteria situation where the WTRU determines the transmission type for data to be transmitted based on a property of the data available for transmission, the WTRU may select the transmission type for data based on QoS requirements of the data to be transmitted. For example, the WTRU may select the transmission mode (e.g., mode 1 vs mode 2) for a packet based on a (pre)configured mapping of QoS parameter associated with the data (e.g., VQI, PPPP, PPPR, latency, reliability, range, etc.) and transmission mode.

In one example of this situation, the WTRU may be (pre)configured with a set of VQI for which, or a threshold of VQI above/below which, a WTRU should transmit a packet using mode 1/mode 2. If a packet is received and tagged with a VQI that satisfies the condition, the WTRU may transmit the packet using mode 1/mode 2. Otherwise, the WTRU may transmit the packet using mode 2/mode 1.

In another example of this situation, a WTRU may select a RAT for transmission based on the VQI associated with that RAT, in addition to measurements of CBR associated with each RAT. Specifically, a WTRU may select the RAT for a transmission based on a (pre)configured table of VQI and CBR (e.g., LTE CBR or NR CBR) or CBR difference between the RATs. A WTRU may prioritize NR RAT to be used for certain transmissions for which NR RAT may be tailored, unless the CBR is high or significantly higher than the LTE CBR. Such prioritization may be built into the RAT selection based on VQI/CBR table (pre)configured at the WTRU.

For the criteria situation where the WTRU determines the transmission type for data to be transmitted based on a on the frequency and/or the size of the transmission(s). Specifically, a WTRU may determine the transmission type based on the frequency of transmissions (i.e., periodic or non-periodic, and the periodicity of the transmissions) and/or the message size (e.g. maximum message size, minimum message size, average message size, etc.). For example, a WTRU may be configured to use mode 2 for periodic transmissions, in combination with possibly other conditions (e.g., periodic transmissions for which CBR above/below a threshold). Similarly, a WTRU may be configured to use mode 1 if the average/minimum/maximum message size (e.g., for a SLRB) is above a threshold.

For the criteria situation where the WTRU determines the transmission type for data to be transmitted based on a the properties of the sidelink session. In one instance, a WTRU may determine the transmission type based on the group size of sidelink groupcast. For example, for a group with a large number of members, a WTRU may be configured to use mode 1 so that the feedback resources from all receiver WTRUs can be allocated by the network. Similarly, a WTRU may be configured to use mode 2 for a sidelink groupcast when the group size is small. Here, a transmitter WTRU may allocate the feedback resources for each of the receiver WTRUs. The HARQ feedback mechanisms may also be used to determine the transmission type. For the HARQ NACK only mechanism, the receiver WTRUs may share the feedback resource for NACK message only. Hence, a WTRU may be configured to use mode 2 for a sidelink groupcast. If HARQ ACK/NACK mechanism is used, a WTRU may be configured to use mode 1 for a sidelink groupcast.

For the criteria situation where the WTRU determines the transmission type for data based on the availability of adequate resources available for that transmission type, such a determination may be based on any of the following determined by the transmitting WTRU, or determined by a peer WTRU (e.g., a WTRU in a unicast link with the transmitting WTRU) and indicated to the transmitting WTRU: availability of SR resources, potentially associated with a specific RAT, and/or a specific cast type, and having acceptable timing/latency relative to the arrival of the data; available uplink resources with acceptable timing/latency for transmission of BSR (e.g., to indicate the arrival of the data); available periodic resources with acceptable timing/latency for transmission of data, possibly associated with specific requirements or specific logical channel; a WTRU detects a change in periodicity, offset, packet size of some data (e.g., the WTRU may change to mode 2 transmissions for a certain time when it detects changes in periodicity, offset, or packet size of some data); available SL grant of a specific type, possibly in combination with QoS requirements associated with the data; amount of resources configured by the network for either transmission type (e.g., a WTRU determines the transmission type based on the amount of resources configured by the network for either transmission type, where such a decision may be performed to use an equal proportion of resources in either type);

and/or, inability to select sufficient resources using mode 2 resource selection, or failure of mode 2 resource selection.

Regarding the available SL grant of a specific type, a WTRU may select to use an LTE grant or an NR grant (assuming both grants are available) for data transmission with low latency requirements depending on which grant is available first in time, and which has properties that satisfies the requirements of the data (e.g., grant size, MCS for transmission, number of configured retransmissions). Such a grant may be a mode 2/4 grant or a mode 1/3 grant.

Regarding the inability to select sufficient resources, a WTRU may decide to use mode 1 for some data transmissions following a resource selection procedure that may fail due to any of the following reasons: failure to acquire a mode 2 resource with LBT following a period or following a number of attempts, due to, for example, one/more/all of the available resources selected for transmission fail LBT (e.g., are occupied during clear channel assessment) or due to the number of failures, or number/amount of back-off time exceeds a threshold, possibly related to the required latency of the packet; the number of mode 2 resources deemed available for transmission, either determined at resource selection, or determined periodically, is below a (pre)configured or defined threshold, where the determination of availability of mode 2 resources may include exclusion of resources reserved in advance by an SCI-like transmission, and/or measurement of RSRP/RSSI on PSSCH/PSCCH; the scheduling WTRU for mode 2d is not available or reachable during some time period; and/or, one/more/all of the resource patterns configured to the WTRU, possibly for use with the data to be transmitted, are unavailable, or do not meet the latency requirements of the data to be transmitted.

Further regarding the inability to select sufficient resources, a WTRU may decide to use the NR RAT or LTE RAT based on the number of, possibly recent, resource allocations deemed to be successful on either RAT. Specifically, a WTRU may measure the number or ratio of resource selection procedures on each RAT for which x % of the resources were determined as available during the resource selection, and may select the RAT for which this number or ratio is a minimum Further regarding the inability to select sufficient resources, the resource selection may be based on sensing results and/or measurements determined at the transmitting WTRU, or based on sensing results and/or measurements provided by a peer WTRU.

Further regarding the inability to select sufficient resources, a WTRU may determine insufficient resources for resource selection if it performs carrier selection and the number of allowed/selected carriers is below a certain number, where such a number may be related to the bearer/flowNQI of the data to be transmitted.

In one scenario related to determining the transmission type based on availability of resources, the WTRU may use mode 2 when SR/BSR resources are not available or do not meet timing requirements. A WTRU may use mode 1 transmissions provided it is configured with available SR resources to meet timing requirements of the data to be transmitted, or can obtain a grant for BSR transmission within sufficient time to transmit the data. If the WTRU is not configured with sufficient SR resources, or if the latency determined by the WTRU for transmission of BSR and subsequent sidelink data is larger than the latency requirements of the data transmission itself, the WTRU may use mode 2 resources (e.g., forward-booked resources or one-shot resources). Upon determination that mode 1 cannot be used for the above reasons, the WTRU may either perform mode 2 resource selection, or may prioritize transmission of the said data on existing mode 2 grants (e.g., periodically occurring resources).

In one scenario related to determining the transmission type, based on availability of resources, a WTRU may use NR RAT when SR/BSR resources for LTE RAT are not available or do not meet the timing requirements. In an example of a WTRU configured to use mode 1 NR simultaneously with mode 3 LTE, a WTRU may be configured with SR resources specific to each RAT. A WTRU may determine the sidelink RAT on which to transmit a packet based on the timing of the NR RAT SR relative to the LTE RAT SR, potentially in combination with a configured rule. Specifically, a WTRU may be configured to transmit data, potentially associated with a specific service, cast, or the like, on the LTE/NR RAT as long as the SR configuration on the LTE/NR RAT allows the WTRU to transmit packets within the required latency. If a packet arrives and the LTE/NR RAT SR is configured such that the latency of the packet is not respected, the WTRU may transmit the packet on the NR/LTE RAT instead. The WTRU may transmit an NR/LTE SR to the network for the associated data, and include such data in the data to be multiplexed on future NR/LTE grants.

In one scenario related to determining the transmission type based on availability of resources, a WTRU may use mode 1 when resource selection using mode 2 does not meet timing requirements. In an example, a WTRU may be configured to use mode 2 resource selection for data associated with a specific bearer/flow or associated with a specific VQI. A WTRU may further be configured to use mode 1 for such a bearer/flow/VQI if one or a number of (pre)configured or defined resource selection attempts performed for data of the said bearer/flow/VQI is unable to select a resource to meet the QoS requirements (e.g., latency, reliability) of the data. For example, resource selection may require a sensing procedure similar to that of LTE. For a specific VQI, the WTRU may require a (pre)configured percentage X of available resources to be available. A WTRU that performs resource selection for a process whereby X percent of resources are not determined available may transmit the said data packet over mode 1. Alternatively, the WTRU may maintain a count of the number of such failed resource selection attempts, possibly associated with a specific bearer/flow/VQI, and decide to transmit the bearer/flow/VQI over mode 1 when the number of failed resource selection attempts, consecutive, or within a configured time, exceeds a certain amount.

A WTRU in the above scenario may continue to transmit the said bearer/flow/VQI using mode 1, despite the bearer/flow/VQI being configured with mode 2, for a period of time which may be determined by any of the following: a (pre)configured timer; an indication of one or more successful resource selection for other bearer/flow/VQI using mode 2; and/or a measure of congestion on the mode 2 pool changes to below a configured threshold In one scenario related to determining the transmission type based on availability of resources, a WTRU may select the transmission mode based on mode 2 resources pool size/configuration. In an example, the WTRU may select to use mode 1 or mode 2 for transmission of a certain type of data based on the configuration of the mode 2 resource pool. Specifically, a WTRU may use mode 2 for transmission associated with a specific VQI if the time between slots configured for SL transmission in the mode 2 resource pool is smaller than a threshold, whereby such a threshold may be further associated with the VQI or latency requirements of the data to be transmitted. In another example, the WTRU may use mode 1 or mode 2 transmission for data in such a way that the amount or ratio of data using mode 2 is proportional to the size of the pool configured by the network for mode 2 transmissions.

In one scenario related to determining the transmission type based on availability of resources, a WTRU may change transmission mode when detecting a change in periodicity/offset/size or periodic data. In an example, a WTRU may send some data using mode 2 when it detects a change in periodicity/timing/offset of its transmissions. A WTRU may further decide to perform such a mode switch when it is not able to send WTRU assistance information on time to adjust SPS resources to meet the latency requirements of the data associated with an SPS configuration. The WTRU may send only a portion of the data mapped to an SPS configuration using mode 2 (e.g., in the case of a size change). A WTRU may, upon detection of a change in periodicity/timing/offset, decide to send all or parts of the data which utilize the SPS resources. The WTRU may still send WTRU assistance information associated with the SPS configuration. The WTRU may resume the use of mode 1 SPS resources following reconfiguration by the network of the SPS configuration such that it meets the new periodicity/offset/size requirements.

For the criteria situation where the WTRU may determine the transmission type based on a network decision(s), the network may indicate to the WTRU the transmission type, either explicitly, or implicitly, based on any of the following: RRC configuration; DCI; and/or MAC CE.

Regarding RRC configuration, in one example, a WTRU may be configured explicitly to use a specific transmission type, potentially associated with certain types of data; in another example a WTRU may receive an SPS reconfiguration for an SPS process (e.g. type 1 or type 2 configured grant). If the grant size associated with reconfiguration is smaller than the request grant size in WTRU assistance information, the WTRU may transmit the remainder of the data (e.g., difference between the grant size requested in WTRU assistance information and actual SPS grant size provided by the network) using mode 2

Regarding DCI, in one example, a WTRU may receive an indication in DCI that only a certain portion of the amount reporting in BSR will be handled by the network using mode 1. The WTRU may then utilize mode 2 to transmit the remainder of the data in its buffers, for which it had originally sent buffer status for in BSR.

Regarding MAC CE, in one example, a WTRU may receive a MAC CE to indicate that a logical channel should be changed from using one transmission type to another transmission type.

For the criteria situation where the WTRU may determine the transmission type based on Uu coverage or Uu-defined area, the determination may be based on the Uu coverage of the WTRU, possibly in relation to the Uu coverage of other WTRUs. Determination of Uu coverage by a WTRU may comprise of one or more factors.

In one factor, there may be a determination of whether the WTRU performs V2X communication while in coverage or out of coverage. Specifically, a WTRU may select a transmission type, possibly for some type of data, depending on whether the WTRU in question, or other related WTRUs (e.g., destination of a unicast/groupcast link) are in coverage or out of coverage.

In another factor, there may be consideration of the Uu quality of the WTRU, such as Uu RSRP. Specifically, a WTRU may select a transmission type, possibly for some type of data, based on the measured Uu RSRP being above or below a threshold.

In another factor, there may be consideration of the system information validity area for a WTRU. Specifically, a WTRU may select a transmission type, possibly for some data, based on whether the WTRU and a peer WTRU have the same/different system information validity area.

In one scenario related to the Uu coverage or defined area, the WTRU may use mode 1 for unicast as long as WTRUs are served by the same gNB/SysInfoArea/PLMN. In an example, a WTRU may be configured to use mode 1 for unicast/groupcast transmissions when the WTRUs involved in unicast/groupcast transmissions are all in coverage, or under the coverage of the same gNB, same PLMN, same system information area, or similar. A WTRU may move ongoing unicast transmissions using mode 1 to mode 2 when any of the WTRUs moves out of coverage.

In some cases, a WTRU may transmit an indication of change between in coverage and out of coverage, or may transmit the served gNB/PLMN/SysInfoArea and/or indication of change of the service gNB/PLMN/SysInfoArea. Such a transmission of change indication may be broadcast by the WTRU, or may be transmitted using unicast/groupcast transmissions only to the WTRU in which a WTRU is currently communicating with in unicast/groupcast. Such a transmission of change indication may be transmitted on PSCCH, SL-MIB, or PSSCH. PSSCH transmissions may take the form of a MAC CE or SL-RRC message. The WTRU may include the new served gNB, PLMN, or SysInfoArea with the indication, or may include in the indication whether the WTRU is in coverage or out of coverage, and/or include any Uu measurements of gNBs to which the WTRU is camped/connected. The WTRU may further include measurements of neighbor gNBs in such indication.

A WTRU may transmit an indication of a change of scheduler WTRU or head WTRU following similar methods as above.

A WTRU that receives an indication may decide to change between mode 1 and mode 2 transmissions based on its own Uu connection status and the information in the indication. Specifically, a first WTRU in coverage of an gNB may decide to transmit using mode 1 to a second WTRU in unicast when receiving an indication from that second WTRU that indicates that the second WTRU is also in-coverage of the same gNB. Alternatively, if a first WTRU receives an indication from a second WTRU that indicates the second WTRU is in coverage of a different gNB, or a gNB that is not part of a predefined list of gNBs, the first WTRU may change from transmitting mode 1 unicast to mode 2 unicast to that second WTRU.

In one scenario related to the Uu coverage or defined area, a WTRU may use mode 1 as long as Uu RSRP is above a threshold. In an example, a WTRU may be configured to use mode 1, possibly for a certain type of data, as long as the Uu RSRP measured by the WTRU is above a (pre)configured threshold. The WTRU may use mode 2 otherwise. In addition, a WTRU may be configured with different RSRP thresholds associated with different bearer/flow/VQI, and may select to use mode 1 for a specific flow/bearer/VQI when the RSRP of Uu is above the threshold associated to that flow/bearer/VQI. Additionally, such a threshold may further be speed dependent.

For the criteria situation where the WTRU may determine the transmission type based on service type, the WTRU may determine the transmission type to be used for sidelink data based on the service type of the transmitted data. A WTRU may be (pre)configured with a mapping of service type to transmission type such as: a RRC mapping, or mapping provided by upper layers, of destination ID to transmission mode (e.g., mode 1 or mode 2); RRC mapping, or mapping provided by upper layers, of destination ID to RAT (LTE RAT or NR RAT); based on the above mapping, the WTRU may select the transmission mode and/or the RAT for transmission of a packet on sidelink. Additionally, the above mapping may further depend on other factors as discussed herein. For example, a WTRU may configured with a mapping of destination ID to transmission mode for each range of measured CBR, and/or may have a mapping configured for different zones or geographical locations, and the WTRU may respect such mapping under each CBR and/or geographical area.

For the criteria situation where the WTRU may determine transmission type to be used for sidelink data based on measurements of sidelink load or quality, and/or resource availability, such a decision may further depend on comparison of such measurements of sidelink load or quality associated with the other transmission type. A WTRU may select the transmission type based on the lowest load/best quality, or a WTRU may select one transmission type as long as the load associated with that transmission type is below a certain threshold, or the quality of that transmission type is above a certain threshold.

The WTRU may base transmission type decisions based on measures of any or a combination of the following: channel busy ratio (CBR) measurements on a pool, resource patterns, or BWPs; the WTRU's own channel occupancy (CR), possibly associated with one or more pools, resource patterns, or BWPs; RSSI measurements of sidelink resources, possibly associated with one or more pools, resource patterns, or BWPs, or subset of such that may correspond with the resources selected by a WTRU for its own transmissions; RSCP measurements of sidelink channels, such as PSSCH, feedback channels, synchronization signal, or reference signals, possibly transmitted by one or more related WTRUs, such as the WTRUs to which a WTRU is currently in a unicast/groupcast link with; estimated number of WTRUs in an area; number of carriers/BWPs/resource pools configured; and/or the detection of a received preemption signal.

In one example, the WTRU may be configured to measure CBR of mode 2 pool in NR RAT and mode 4 pool in LTE RAT. The WTRU may determine the RAT for transmission of some or all of its data based on such CBR measurements, and may decide to transmit in the RAT having lower CBR, or may change the RAT of transmission when that RAT has a CBR that is below a threshold of the CBR measured on the other RAT. The WTRU may be further configured with a rule to convert LTE CBR to NR CBR or vice versa, so that they can be compared equally.

In another example, the WTRU may be configured to measure CBR and/or CR of mode 2 pool and may transmit some or all of its data using mode 1 when the CBR and/or CR of the mode 2 pool is above a (pre)configured threshold.

In another example, a first WTRU may be configured to measure the RSRP of a sidelink reference signal received from a second WTRU to which the first WTRU is configured with unicast. For certain types of data, the first WTRU may be configured to transmit that data using the unicast transmission type only when the RS-RSRP is above a certain threshold. The first WTRU may further maintain separate logical channels associated with transmission of data or a service to the second WTRU—one using a unicast link (e.g. configured with feedback channel, HARQ, etc) and another using SL-broadcast mechanism. The first WTRU may send packets destined to a specific other WTRU and/or service using the unicast link when the RS-RSRP is above a certain threshold. One advantage of such an approach would be to limit a large number of HARQ retransmissions for eMBB-type data but still apply HARQ-type transmissions for URLLC-type data.

In another example, a WTRU may be configured to select a RAT for transmission, possibly for a specific service or type of transmission (e.g., associated with a specific QoS) based on the number of carriers available for transmission on either RAT. Specifically, a WTRU may select the RAT for a service or type of data based on the ability to use a larger number of carriers on one RAT compared to another RAT. The WTRU may determine the number of carriers it can use for a service or type of data on a RAT based on the carriers configured for transmission on that RAT for that service and/or the carrier capability of the WTRU on each RAT.

In another example, a WTRU may use mode 1 for transmissions for some or all of its data following reception of a preemption signal from another WTRU. Such preemption signal may further indicate which data should utilize mode 1 transmissions. A WTRU may continue to use mode 1 transmissions for a period of time that is (pre)configured or indicated in the preemption signal. The same example and WTRU behavior related to preemption may also be used for change from NR RAT to LTE RAT, or for change from unicast to broadcast.

Without loss of generality, the above approaches related to these situations may be combined with other approaches described herein. For example, the WTRU may select between mode 1 transmission and mode 2 transmission for specific data based on comparison of Uu RSRP and measurements of CBR on a mode 2 sidelink pool. Specifically, a WTRU may select a transmission type using mode 2 when the Uu RSRP is below a specific threshold and the CBR of the mode 2 transmission pool is below another specific threshold. Alternatively, the WTRU may select a transmission type using mode 1.

For the criteria situation where the WTRU may determine the transmission type based on Uu RRC state, possibly combined with the status of RRC timers, the WTRU may select the transmission type, or change transmission type, based on any of the following: the WTRU transitions from one RRC state (e.g., RRC_CONNECTED, RRC_IDLE, RRC_INACTIVE) to another (e.g., a WTRU may change to unicast transmission of a certain type of data when it transitions to RRC_CONNECTED, but may use broadcast transmissions in RRC_IDLE and RRC_INACTIVE); the WTRU starts an RRC-related timer, such as, but not limited to, timers related to RLF, BFR, access barring, or the like. For the RRC related timers, in one example a WTRU may change to mode 2 transmission when T310 is started (e.g., upon the detection of PHY layer problems for the PCell), and may re-initiate mode 1 transmissions when T310 is stopped (e.g., due to receiving N311 consecutive in-sync indications from lower layers). In another example related to RRC-related timers, a WTRU may change to broadcast transmissions when T310 is started (e.g., upon the detection of PHY layer problems for the PCell), and may re-initiate mode 1 transmissions when T310 is stopped (e.g., due to receiving N311 consecutive in-sync indications from lower layers). In another example related to RRC-related timers, a WTRU may use mode 2 transmissions for some or all SL transmissions while T309 is running (e.g., access attempt is barred. In another example related to RRC-related timers, a WTRU may use broadcast transmissions to transmit unicast when a beam failure occurs during a unicast transmission.

For the criteria situation where the WTRU may determine transmission type based on WTRU dynamics, the WTRU may select the transmission type for some data based on any or a combination of the following: the measured WTRU speed; the absolute WTRU location; the relative WTRU location with another WTRU; the relative WTRU speed with another WTRU; the relative WTRU direction with another WTRU; and/or, detection of a change in any of speed/location/direction by the WTRU (e.g., the WTRU uses a transmission type temporarily (e.g., based on a timer) when there is a detected change in any of speed/location/direction).

In an example, the WTRU may be configured to transmit certain data, possibly destined for a specific WTRU, using a unicast link as long as the speed of the WTRU is below a threshold, and may transmit the data using broadcast otherwise In another example, the WTRU may be configured to use mode 1 for some/all data if the WTRU speed is below a (pre)configured threshold and may use mode 2 otherwise.

In another example, a first WTRU may be configured to use unicast transmissions if the distance between the first WTRU and a second WTRU (e.g., the second WTRU being that which the first WTRU is communicating with) is below a (pre)configured threshold, or some threshold dependent on the properties (e.g., QoS) of the data being transmitted.

For this situation, a WTRU may perform periodic sidelink transmissions of its location, speed, or direction. Such transmissions may be performed on PSCCH, SL-MIB, or PSSCH. Transmissions of such information on PSSCH may be made in a MAC CE or SL-RRC message. A WTRU that receives this location/speed/direction transmissions may use this information, in addition with its own dynamics (e.g., vehicle dynamics), to determine the transmission type based on (pre)configured rules.

For the criteria situation where the WTRU may determine the transmission type based on the user of another transmission type, such a decision may be based on a (pre)configured restriction, and such restriction may apply in combination, or under the condition, of any additional approach/condition for type selection described herein. For example, a WTRU may be configured to use mode 1 only when performing unicast transmissions which are associated with a specific QoS.

For the criteria situation where the WTRU may determine the transmission type based on carrier/BWP/resource pool restrictions, the WTRU may be (pre)configured with a specific transmission type based on these criteria. For example, a WTRU may be configured to use mode 1 on a first carrier and use mode 2 on a second carrier. Alternatively, a WTRU may use one transmission type on a carrier and another transmission mode on a different carrier based on other factors described herein. For example, a WTRU may be configured to use mode 1 on the carrier with the largest measured CBR, and may be configured to use mode 2 on other carriers. The number of carriers (e.g., those with the largest CBR) on which to use mode 1 may be further (pre)configured or depend on WTRU capability, or the number of carriers that can be used for a specific service (e.g., destination address). For example, the number of carriers on which to use mode 1 (e.g., corresponding to the largest CBR) may be defined as a percentage of the carriers configured for a specific destination address, and/or the number of carriers supported by the WTRU.

For the criteria situation where the WTRU may determine the transmission type based on an amount of traffic configured to each type, the traffic used for such a decision may consist of a WTRUs own transmission, or other WTRUs transmissions (e.g. as detected based on SCI transmissions). For example, the WTRU may select the RAT for transmission in order to have an equal amount, or (pre)configured proportion of LTE SL transmission and NR SL transmissions.

For the criteria situation where the WTRU may indicate a chance in transmission type to the network, the WTRU may indicate a change in transmission type for some or all data, whether within the WTRUs buffers or potentially future data to be received by the WTRU, to the network. The WTRU may further be configured with a threshold, above which a transmission type change may be indicated. This threshold may be based on one or more of the following: the amount of data in the WTRU buffers that will be moved from one transmission type to another transmission type; the number of VQI or QoS levels that will change from one transmission type to another transmission type; the amount of change in a measure (e.g., amount of available resources, RSSI, SCI RSCP) which may result in the change of transmission type for some data); and/or other values or measures that will determine a change in the transmission type for certain data.

The WTRU may indicate a change in transmission type using one or more of the following: dedicated SR or PUCCH; RACH (e.g., a 2-step RACH with information of the transmission type change in the RACH procedure); MAC CE, such as BSR or new MAC CE; RRC message; connection establishment and/or resume with new cause value or indication provided in MSG3 or MSG5 (e.g., a WTRU may initiate an RRC connection and provide the information associated with a change in transmission type during the connection establishment).

For the criteria situation where the WTRU may change transmission type based on upon receipt of a mode change from another WTRU, a second WTRU may transmit an indication of transmission type change to a first WTRU or set of WTRUs. For example, the second WTRU may transmit an indication of the transmission mode (e.g., mode 1 vs mode 2, or change to mode 1/mode 2). When the second WTRU decides to change mode, it may transmit a mode change indication on PSCCH, PSSCH, or SL-MIB. Such mode change indication may take the form of a MAC CE or SL-RRC message transmitted on PSSCH to the set of WTRUs that are in unicast/groupcast with the second WTRU. The first WTRU, upon reception of mode change indication from the second WTRU, may decide to change its own transmission mode to match the transmission mode of the other WTRU(s). Specifically, if first WTRU receives a mode change from a second WTRU in which it has a unicast link, indicating that the second WTRU will use mode 2, the first WTRU may change its transmission mode to that unicast link from mode 1 to mode 2 (e.g., may transmit all packets specific to that unicast link using mode 2).

In some situations, a WTRU may be configured for mode selection. In one example, a WTRU may be configured with an allowable, required, or preferable mode or transmission type (e.g., mode 1 or mode 2) for a SLRB. Specifically, a SLRB or LCH may be configured to use mode 1 only or may be configured to use mode 2 only. In addition, the WTRU may be configured with conditions in which the SLRB should use mode 1 or mode 2. Such conditions may be based on one or more of the following: Uu quality; SL signal quality; amount of data in the WTRU buffers for SLRB; resources/carrier/BWP; frequency/periodicity; and/or, size of transmission.

Concerning Uu quality, a WTRU may be configured with conditions related to the Uu quality for which a SLRB should use mode 1 or mode 2. The Uu signal quality may be determined by any of the following: cell level measurements (i.e., RRM measurements) of the current cell or other cells; and/or, allowable UL power (e.g., power headroom). For example, a WTRU may be configured to use mode 1 as long as measured cell quality of its service cell is above a threshold, and to use mode 2 otherwise.

Concerning SL signal quality, a WTRU may be configured with conditions related to SL quality for which a SLRB should use mode 1 or mode 2. The SL signal quality may be determined based on: measure of congestion (e.g., CBR) of the transmission resource pools used by the WTRU; measure of HARQ success rate over sidelink (e.g., number of NACKs over a time period, number of consecutive NACKs, number of missing of ACK/NACK); measure of channel quality on a reference signal, such as CSI-RS, DMRS, etc.; measurements reported from the peer WTRU, such as SL CQI reports; allowable SL power (e.g., power headroom); SL RLM/RLF status associated with a unicast link which contains that SLRB (e.g., whether RLF timer is running, number of IS/OOS from lower layers, trigger of RLF); and/or, availability of resources on sidelink, such as size of configured resource pools, possibly within a certain time budget, metrics related successful resource selection (i.e., resource selection can be performed to meet latency requirements). For example, a WTRU may be configured to use/prefer mode 2 for a SLRB as long as the CBR is below a threshold, and use mode 1 otherwise. In another example, a WTRU may be configured to use/prefer mode 2 for a SLRB associated with a unicast link as long as the unicast link has not triggered RLF, or does not have RLF counter running.

Concerning the combination of Uu quality and SL quality, a WTRU may be configured with a condition for preferring or using mode 1 or mode 2 based on which involves both Uu quality metrics and SL quality metrics. For example, such a condition may be based on the comparison of CBR and Uu cell measurements, the difference of such measures.

Concerning the amount of data in the WTRU buffers for a SLRB, a WTRU may be configured with a condition to use one mode (mode 1 or mode 2) over another as long as the amount of data pending for the SLRB is below a threshold. Such a restriction or threshold may further be related to the size of resources on sidelink (e.g., amount of resources for transmission, HARQ feedback, or measured congestion on these resources).

Concerning resources/carrier/BWP/ or the like, there may be a condition based on the values selected for transmission by the WTRU, and determined by restriction of transmission mode that can be used on each of these.

Without loss of generality, a condition may be provided which combines any of the above conditions.

As noted previously, where a WTRU has simultaneous operations there may be one or more logical channel associated with a transmission type, however, in some cases one logical channel may be prioritized over another. A WTRU may be configured with at least one separate logical channel prioritization (LCP) procedure per transmission type. Such a configuration may be applicable to different transmission types, such as: a WTRU operating with simultaneous mode 1 and mode 2 may perform mode 1-specific LCP procedure when the WTRU receives a grant from the network and may perform mode 2-specific LCP procedure when a grant from resource selection becomes active; a WTRU operating with simultaneous LTE and NR transmissions may perform and LTE-specific LCP when the WTRU processes a grant on an LTE carrier, and may perform an NR-specific LCP when the WTRU processes a grant on an NR carrier, a WTRU operating with unicast and groupcast may perform unicast-specific LCP when the WTRU decides or is instructed to use a grant for unicast and performs broadcast-specific LCP when the WTRU decides or is instructed to use a grant for groupcast A WTRU may use or be configured with different parameters or rules to use for the LCP associated with each transmission type, including, but not limited to: handling of prioritization of logical channels (e.g., a grant associated with LTE may utilize PPPP as the logical channel selection criteria, while a grant associated with NR may utilize VQI or both priority and latency parameters derived from VQI); determination of the amount of data to be considered in each logical channel (e.g., a grant associated with LTE may process each logical channel until the data for that logical channel is exhausted, while a grant associated with NR may process may process each logical channel until the PDB associated with that logical channel, if the logical channel is associated with a PDB); and/or, rules associated with RLC SDU segmentation (e.g., a grant associated with an LTE process may allow RLC segmentation while a grant for NR may not allow RLC segmentation).

Alternatively, the WTRU may be configured to use completely separate procedures for LCP, where each procedure is associated with each transmission type, and/or where each procedure defines the rules and parameters (e.g., as per the examples above) differently.

A WTRU that receives a grant associated with one transmission type may perform LCP using the procedure/parameters/rules associated with that transmission type. A WTRU may further determine on its own the transmission type for a specific grant. Based on such a determination, the WTRU may perform LCP using the procedure/parameters/rules associated with the selected transmission type.

In some situations, a WTRU may determine whether a grant is for unicast/groupcast/broadcast based on implicit/explicit network indication (e.g., for mode 1), and/or based on QoS associated with pending data (e.g., priority, latency, etc.).

Regarding the implicit/explicit network indication, a WTRU may receive an explicit indication in DCI assigning the grant, which indicates unicast, groupcast, or broadcast. Additionally/alternatively, a WTRU may receive a DCI indicating the RAT of the grant, whereby the RAT does not allow unicast/groupcast transmissions (e.g., LTE RAT), and the WTRU may implicitly interpret such grant as a grant for broadcast transmission. Additionally/alternatively, a WTRU may receive a modulation/coding parameter or resource-related parameter (e.g., time/frequency/beam/carrier/BWP/pool) in DCI which implicitly indicates one type of cast based on WTRU configuration, WTRU capability limitation, and/or WTRU state. For example, a WTRU may be configured with unicast transmission and broadcast transmission in separate carriers and the DCI may indicate the cast for transmission implicitly from the carrier. In another example, a WTRU may be configured with unicast transmission on a subset of beams and broadcast transmission on all beams, where If the DCI contains information to determine the subset of beams, the WTRU may use the grant to satisfy unicast logical channels.

Regarding the QoS associated with pending data, a WTRU may decide to use a grant for unicast, groupcast, broadcast by considering first the logical channels with the highest priority and/or lowest latency, and/or highest reliability, and the like. For example, a WTRU may select, from its logical channels, the logical channel with data pending with the highest priority and/or lowest latency. The WTRU may determine whether the grant being processed is unicast/groupcast/broadcast based on whether the selected logical channel is unicast/groupcast/broadcast, and where possibly this may be considered at the time in which the grant is received. The WTRU may then process LCP for this grant using the appropriate procedure for that cast type. In such an approach, a WTRU may further perform QoS-based association when the network indicates a grant can be used for any transmission type. For example, the DCI may explicitly or implicitly indicate that the grant can be used for either unicast or broadcast transmission.

In some situations a WTRU may be configured to handle simultaneous grants of different types differently depending on the nature of the transmission type (e.g., mode vs. RAT vs. cast) and/or WTRU capability. For example, a WTRU that is capable for simultaneous transmission with different transmission types may perform both transmissions, while a WTRU that is not capable may select one of the transmissions based on specific rules discussed herein.

A WTRU's capability for simultaneous transmission using different types at the same time may depend on the nature of the transmission type. For example, a WTRU may not be allowed to transmit mode 1 and mode 2 or unicast and broadcast at the same time on the same RAT, but may be allowed to perform mode 1 transmission on NR RAT and mode 4 transmission on LTE RAT at the same time, or unicast transmission on NR RAT and groupcast transmission on LTE RAT at the same time.

In one approach, if a WTRU receives a mode 1 grant which overlaps in time with a mode 2 grant (e.g., resource selected by the WTRU), the WTRU may prioritize the mode 1 grant and ignore/cancel the mode 2 grant. A WTRU may further perform resource reselection when it ignores/cancels a mode 2 grant due to the conflict between a mode 1 grant and a mode 2 grant.

In another approach, if a WTRU receives a mode 1 grant that overlaps in time with a mode 2 grant (e.g., resource selected by the WTRU), the WTRU may prioritize the grant (e.g., mode 1 or mode 2) in which the associated logical channels (e.g., mode 1 logical channels versus mode 2 logical channels) has the highest priority/lowest latency data available for transmission. If a WTRU ignores/cancels a mode 1 grant, the WTRU may trigger immediate transmission of BSR. Alternatively, if a WTRU ignores/cancels a mode 1 grant, the WTRU may transmit a SR on PUCCH to indicate that the mode 1 grant was ignored/canceled.

In some situations, a WTRU may perform LCP procedure associated with a specific transmission mode by considering only logical channels associated with that transmission mode at the time the LCP is performed. This may be applicable to the first modeling of fixed logical channels to transmission type mapping and/or the second modeling of a WTRU moving a logical channel from one transmission type to another. A WTRU may maintain a set of logical channels associated with each transmission mode. A WTRU, assuming modeling of a WTRU moving a logical channel from one transmission type to another, may change the transmission mode associated with a logical channel. The WTRU may evaluate the logical channels associated with each transmission mode at the time of the grant.

In an example, a WTRU may be configured using the second modeling of a WTRU moving a logical channel from one transmission type to another for the case of mode 1 and mode 2 transmissions. When a WTRU receives a mode 1 grant, the WTRU may perform LCP by considering only the logical channels which are logical channels associated with mode 1 at the time of reception of the mode 1 grant.

A WTRU may change the transmission mode associated with a logical channel during the performance of LCP (e.g., due to an event received from lower layers, or expiry of a timer). In such a case, the WTRU may delay the change of transmission mode until: after the completion of the LCP procedure; and/or after performance of retransmissions for the MAC PDU being constructed by the LCP procedure.

In some situations, the WTRU may be configured with logical channels associated with a specific transmission type (e.g., fixed), and logical channels not associated with any transmission type (e.g., flexible). This may apply to the third modeling where a logical channel can be associated with multiple transmission modes. The WTRU, when performing LCP for a grant with an associated transmission type, may consider only logical channels associated with that transmission type, and logical channels not associated to any transmission type. The WTRU may perform LCP by first selecting the logical channels with the highest priority, regardless of the transmission type, and allocating resources to those logical channels until either grant is exhausted or the logical channel is satisfied (e.g., potentially up to a prioritized bit rate).

In some situations, the WTRU may be configured with or determine a prioritization of logical channel to transmission type. This may apply to the third modeling where a logical channel can be associated with multiple transmission modes. The WTRU may perform LCP for a grant associated with a transmission type by selecting data on the logical channels prioritized for that transmission type as long as there is data in the buffers of such logical channels. In case there is no data left in the buffers of any prioritized logical channels, or when each logical channel is served up to its prioritized bit rate, the WTRU may then select data associated with non-prioritized logical channels (e.g., prioritized for the transmission type).

In an example, a WTRU may determine logical channels for data packets based on QoS. A WTRU may further determine a prioritization of logical channel to a mode (e.g., mode 1 and mode 2) based on decision criteria, such as that described herein. When a grant for mode 1 is received, the WTRU may select all logical channels prioritized for mode 1 to satisfy the grant. If all such logical channels are satisfied (e.g., logical channels are empty or were satisfied until their prioritized bit rate), the WTRU may then select non-prioritized logical channels to fill the remainder of the grant.

In some situations, the LCP procedure associated with a transmission type may satisfy a logical channel that can be transmitted on any transmission type up to a percentage of its PBR. If a logical channel is not associated with a PBR, the WTRU may satisfy a percentage of the available data in the WTRU buffers. The WTRU may determine the percentage of the PBR for each transmission type based on any of the following (note: for a specific logical channel, the PBR could be infinity): the percentage of the PBR may be configured by the network; the percentage of the PBR may be based on the percentage of BSR reported to each transmission type in the last BSR to the network; the percentage of the PBR may be based on the measured quality of each transmission type (e.g., LTE RAT vs NR RAT); the percentage of the PBR may be determined or derived from any other condition/criteria described herein.

In some situations, a WTRU may determine prioritization between NR and LTE QoS transmission types. This may arise where LTE prioritization is based on PPPP while NR prioritization is based on VQI. Inter-RAT prioritization may be required for LCP, BSR transmission, resource selection, and the like.

In one approach, a WTRU may be provided, per packet or per radio bearer, with the QoS parameters associated with both RATs and may base its prioritization rules on the QoS parameter of a single RAT. For example, a WTRU may be provided, by the upper layers, with an NR packet which contains both PPPP and VQI. The WTRU may perform prioritization decisions between LTE packets and NR packets by considering the PPPP associated with each packet.

In another approach, a WTRU may be provided, by upper layers, or by the network, with a table that can be used to derive the QoS parameter in one RAT (e.g., the PPPP) from the QoS parameter in another RAT (e.g., VQI). The WTRU may then perform prioritization based on the QoS parameter in one RAT. For example, the WTRU may be provided with a table which maps VQI to PPPP. The WTRU may then perform prioritization for both LTE packets and NR packets based on PPPP.

In another approach, the WTRU may be provided with a mapping table, for one RAT or for both RATs, which derives one or multiple QoS parameters from the QoS parameter provided by upper layers and may derive a priority for that RAT based on a predefined or (pre)configured rule. For example, for LTE packets, the priority of the packet may be the PPPP. For an NR packet, the WTRU may be configured with a table which derives the reliability, range, latency, priority, and data rate from the VQI. The WTRU may be (pre)configured with one or more rules to derive priority from these individual QoS parameters derived from VQI. For example, one such rule may be to assign priority of the packet to be equal to the priority derived from VQI, plus a compensation factor related to latency (e.g., increase priority by one if latency<x and decrease priority by 1 if latency>y). A WTRU may further be configured with different rules for different prioritization operations at the WTRU, such as: LCP (e.g., selection of the logical channel having data with the highest priority among all data pending at the WTRU); BSR (e.g., prioritization of LTE BSR vs NR BSR, or determination of the LCGs to include in truncated BSR). In another example, one such rule may be to assign the priority to the latency based on a (pre)configured mapping of latency, in ms, to priority (e.g., in absolute numbers, mapping to the same scale as the PPPP).

As noted previously, a WTRU may report the buffer status, however, in some cases there may be SR/BSR procedures to address QoS requirements and simultaneous transmission types.

In some situations, a WTRU may have SR/BSR procedures that address NR QoS requirements, where the WTRU selects/changes the BSR format and/or mapping QoS to LCG based on data in currently its buffers. This may arise in determining how to report buffer status associated with a wide range of QoS given a limited number of LCGs in BSR. The WTRU may assume a different mapping of QoS to LCG when determining the BSR, or it may transmit a BSR with a different format depending on the QoS of the data in its buffers.

The different mapping of QoS to LCG may comprise any of the following: different number of QoS levels or QoS parameters mapped to a given LCG (e.g., map VQI value 1, 2 to LCG 1, VQI 2, 3 to LCG 2, etc., or change such mapping); different number of QoS levels represented by a specific LCG (e.g., some QoS levels may not have a LCG representing them); different association of distinct QoS parameters (e.g., latency vs priority vs reliability) with LCG (e.g., map PPPP to LCG 1, 2, and PPPR to LCG 3, 4, or change such mapping); and/or certain LCG used to represent buffer status for a different QoS parameter in certain cases, but not in others.

The different format of BSR may comprise any of the following: different number of bits in the BSR (e.g., different number of allowable LCGs) associated with LCG (e.g., one format of BSR may assume 4 bits for LCG and 4 bits for buffer status, while another format may assume 5 bits for LCG and 3 bits for buffer status, or one format of BSR may assume 12 bits to report buffer status associated with a single destination ID and LCG, while another format of BSR may assume 24 bits to report buffer status associated with a destination ID and logical channel group, and may further use a different mapping of QoS level to LCG); and/or replacement/re-use of certain fields in BSR to report buffer status associated with certain QoS parameters (e.g., a WTRU may replace the destination address associated with a report of buffer status with an additional QoS parameter, such as reliability or latency, when such data is available in the WTRU buffers, and when the destination address of the report is the same as the previous report).

A WTRU may indicate a change or different mapping/format to the network by one or more of the following: transmitting an RRC message or MAC CE with an index to a (pre)configured mapping/format to be used or with the actual mapping to be used in future BSR reports; transmit the mapping/format used for a specific BSR in the BSR itself, either by a field in the BSR or by the selection of the BSR format or MAC CE type; indicate that a change in the mapping/format has occurred by transmission of a special SR or PUCCH indication, potentially followed by the actual mapping to be used; and/or provide a bitmap, using RRC, MAC CE, or the BSR itself, of the QoS Levels represented by a LCG in a BSR and/or the number of QoS levels represented by each available LCG in the LCG space.

A WTRU may change the format/mapping for BSR from one format/mapping to another based on any of the following triggers: new data arrives for a QoS level for which there is no LCG representing that format in the current/previous BSR format/mapping; the amount of data in the buffers for one or mode QoS levels goes above/below a threshold; and/or the relative amount of data in the WTRU buffers for two or more QoS levels goes above/below a threshold.

In one example, a WTRU may be configured with multiple mappings of VQI(s) to LCG. In one mapping, used as an illustrative example where the WTRU can report 3 LCGs, the WTRU may report buffer status of data associated with VQI 1-2 using LCG 1, VQI 3-4 using LCG 2, VQI 5-6 using LCG 3, and so on, such that all VQI(s) are equally represented. In addition, the WTRU may be configured with a mapping whereby VQI 1 is mapped to LCG 1, VQI 2 is mapped to LCG 2, and the remaining VQIs are all mapped to LCG3. The WTRU may employ the second mapping when data in its buffers is predominately from VQI 1 and VQI 2. Alternatively, if the WTRU has data in its buffers that is equally distributed among VQIs, the WTRU may use the first mapping. The WTRU may indicate a change of mapping (e.g., with an RRC message or MAC CE) or it may indicate the used mapping in each BSR message.

In another example, which may be used in conjunction with the previous example, the WTRU may report BSR using 4 bits for LCG (e.g., total of 16 LCGs) in one scenario where the data in the buffers is limited to a subset of QoS levels, and use 5 bits for LCG (total of 32 LCGs) in another scenario where the data in the buffers contains all or close to all QoS levels.

As noted previously, a WTRU may communicate SR/BSR when determining how to handle a data packet for transmission, however, there also may be SR/BSR approaches to address simultaneous transmission types.

In some situations, a BSR calculation may be based on available mode 2 resources. In this approach, which may be the case of mode 1 vs mode 2 transmission types, a WTRU may calculate buffer status by taking into account the amount of resources reserved or available for mode 2 transmission. Specifically, the WTRU may consider any of the following "reserved" resources in mode 2 when computing the buffer status to send to the network: the total amount of resources reserved by a reservation signal, a forward booking signal, or similar; the total amount of resources associated with a selected resource pattern; the amount of "reserved" resources occurring in the N next reservation period, where N may be predefined or (pre) configured; and/or, the amount of "reserved" resources that can be used to satisfy transmission by logical channels, which can use either mode 1 transmission or mode 2 transmission A WTRU may subtract, from the buffer status of each logical channel or LCG, an estimated amount of data which the WTRU may transmit over the "reserved" resources.

Figure 4:
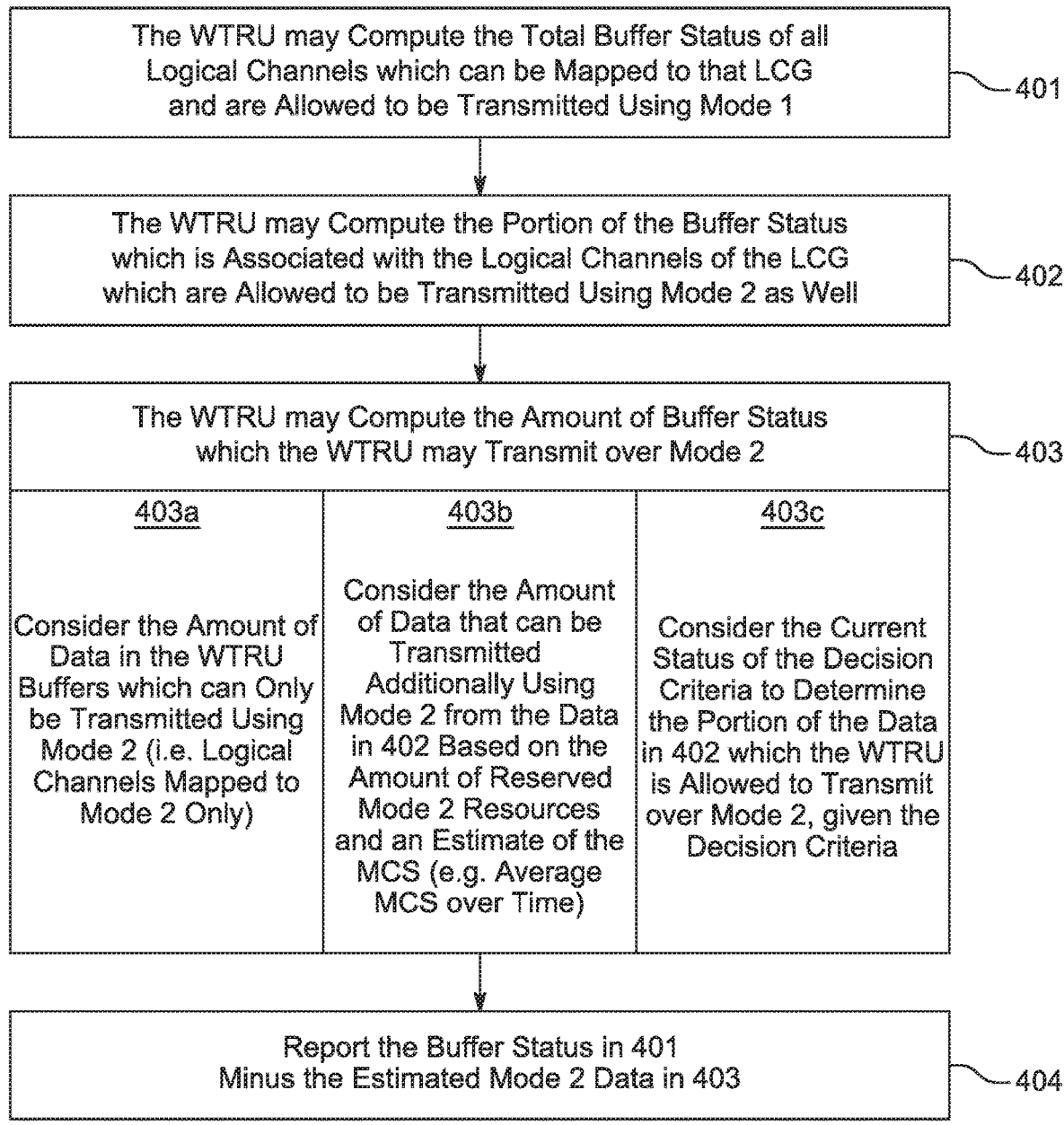
FIG. 4 is a flow chart illustrating an example process related to buffer status report and scheduling request communication.

FIG. 4 is a flow chart of example process of a WTRU determining the buffer status to report to the network in BSR for a given LCG. AT 401, the WTRU may compute the total buffer status of all logical channels which can be mapped to that LCG and are allowed to be transmitted using mode 1. Next at 402, the WTRU may compute the portion of the buffer status in the previous stage that is associated with the logical channels of the LCG which are allowed to be transmitted using mode 2 as well. Next at 403, the WTRU may compute the amount of buffer status in the second stage, which the WTRU may transmit over mode 2, based on the following: 403*a*, the amount of data in the WTRU buffers that can only be transmitted using mode 2 (e.g., logical channels mapped to mode 2 only); 403*b*, the amount of data from the data in step 2 that can be transmitted additionally using mode 2 based on the amount of reserved mode 2 resources and an estimate of the MCS (e.g., average MCS over time); and/or, 403*c*, the current status of the decision criteria, as discussed herein, to determine the portion of the data in the second stage which the WTRU is allowed to transmit over mode 2, given the decision criteria. At 404, the WTRU may finally report the buffer status from the first stage minus the estimated mode 2 data in the third stage.

In some situations, the WTRU may send BSR to indicate change in transmission type. Specifically, a WTRU may trigger a BSR to the network during the decision to send some or all of data, potentially pending at the WTRU, over a different transmission type, or upon a change of any of the conditions for determination of the transmission type.

The WTRU may trigger a BSR when any of the following events occur: the WTRU decides to move a logical channel associated with one transmission type (e.g., mode 1) to be associated with a different transmission type (e.g., mode 2); a change in any condition that defines the mapping of data to transmission type, as discussed herein, occurs; a change in the calculation of the buffer status taking into account the available mode 2 resources, possibly by a certain amount, occurs due to a change in any of the conditions as discussed herein, a change in the estimated MCS, or a change in the amount of reserved mode 2 resources, possibly per time period; a WTRU removes all logical channels associated with a specific transmission type; and/or a WTRU creates new logical channels, potentially a first logical channel, associated with a transmission type.

The following are examples of the condition that defines the mapping to transmission type: a number of failed mode 2 resources selections occurs, potentially in a predefined time window; a change, by a predefined or (pre)configured amount, in the value of a measured quantity associated with mode 2 resource pool, such as CBR, CR, RSSI, average RSCP of SCI transmissions, or number of SCIs in a predefined period; a change, by a predefined or (pre)configured amount, in the estimated number of WTRUs in an area; reception of a preemption signal; and/or other examples discussed herein.

In one example, a WTRU may receive a preemption signal associated with mode 2 transmission, possibly for a given QoS. The WTRU may decide to move all mode 2 traffic, possibly associated with the given QoS, to mode 1 and may transmit BSR to the network upon reception of the preemption signal. The transmitted BSR may indicate the presence of new data for mode 1 transmission by inclusion of a new LCG, along with the buffer status, or by a new buffer status that accounts for the new data to be transmitted using mode 1. Alternatively, the WTRU may send a BSR where the buffer status represents a delta of the new data, compared to the previous BSR report, which may now be transmitted with mode 1. Such an example may be applicable also to the case of other transmission types (e.g., LTE vs NR, where preemption is received on NR and mode 3 is configured for LTE).

In another example, a WTRU may decide to move all its transmissions, possibly associated with a particular logical channel or LCG, to mode 2 transmission due to the detected reduction in CBR of a mode 2 pool. The WTRU may, upon such a decision, transmit a BSR indicating a buffer status of 0 associated with the said LCG(s). Such an example may be applicable also to other transmission types (e.g., LTE vs NR). The WTRU may transmit the said BSR following completion of resource selection procedure for the data in its buffers.

In some situations, a WTRU may indicates the change of a preferable transmission mode configured by the network. In one instance, a WTRU may send BSR or a related message following a change in an usable/preferable transmission mode (e.g., mode 1 vs mode 2) for a SLRB as configured by the network, (e.g., as described herein relating to WTRU configuration for mode selection).

In one example, a WTRU may send BSR to the network following a change in transmission mode (mode 1 or mode 2) of a SLRB (e.g., a SLRB is moved from mode 1 to mode 2). The WTRU may compute the new buffer status for all LCH associated with mode 1 following the change in the mode of a SLRB and may send the new BSR to the network. For example, a WTRU may detect a condition (e.g., Uu quality below a threshold) which triggers a change of a SLRB currently configured to use mode 1 to use mode 2. The WTRU may remove the SLRB from the logical channels associated with mode 1 and move the SLRB to a mode 2 SLRB. The WTRU may further inform the network of the change in buffer status resulting from the change. In another example, a WTRU may detect a condition (e.g., SL RLM).

In one instance, a WTRU may include the BSR for all LCGs in such a BSR. In another instance, a WTRU may include only the LCGs whose buffer status is changed by the change in mode for the given SLRB(s).

In one example, a WTRU may start a timer following the triggering of a condition requiring a change of mode for a specific SLRB. If the condition persists during the timer, the WTRU may send the mode change message to the network as per other scenarios described herein.

In another example, a WTRU may send a BSR and/or related message (e.g., MAC CE, RRC message such as SidelinkUEInformation, etc.) to the network to inform the network of the change in preferred mode for a specific SLRB. Such a message may contain: the SLRB or LCH for which a mode change trigger was determined at the WTRU; the specific condition (e.g., in the form of an index to a list of configured conditions) which triggered the condition; the QoS properties (e.g., PQI, QFI, etc) of the SLRB and/or flows mapped to the SLRB; and/or, the measurements associated to the condition, such as the Uu quality, SL quality, or the like, as described herein relating to WTRU configuration for mode selection.

In such an example, the WTRU may perform any or a combination of the following after its sends the message to the network: the WTRU may initiate a change of mode for the specific SLRB immediately following successful transmission of the indication to the network; the WTRU may stop transmissions associated with the SLRB until re-configuration by the network; and/or, the WTRU may start a timer. If the condition for the mode change is maintained and the timer expires, the WTRU may initiate the mode change. The WTRU, upon initiating the mode change, may transmit BSR, with an updated buffer status for all mode 1 LCGs, as described herein. If the condition for mode change does not persist for the duration of the timer, the WTRU may cancel the timer and inform the network.

The situations described above with regard to SR/BSR procedures may be applicable FIG. 3, which shows the example of data handling when a condition changes. Referring to section 311, here a BSR may need to be sent to the network as a result of the WTRU deciding to change LCH1 from mode 1 to mode 2, since the network no longer need to account for the buffer status of LCH1 since it is moving to mode 2 where the WTRU will conduct the scheduling autonomously. Note that the buffer status shown in section 311 is more full at T1 than at T2 because of the remapping of LCH1 to mode 2.

In some situations, a WTRU may remap the LCG following switching of traffic, which may be applicable to any modeling discussed herein. The WTRU may change the mapping of QoS to LCG used for BSR reporting following the switching of data from one transmission type to another or following the change of any of the conditions described herein. Specifically, a WTRU may be configured with one mapping of QoS parameter (e.g., VQI, PPPP, priority, latency, etc.) to LCG and may indicate to the network a preferred or alternate mapping following the change in a condition, such as those described herein. Alternatively, the WTRU may be configured with more than one QoS to LCG mapping and may indicate to the network a new mapping (e.g., via an index to the new mapping) upon a change in condition. The WTRU may further indicate such an alternate mapping or mapping change when the condition results in the change in transmission type for one or more QoS types (e.g., range or set of VQI) and/or a change in transmission type of one or more logical channels or LCGs.

A WTRU may indicate a change of LCG remapping using an RRC message (e.g., UEAssistanceInformation or SidelinkUEInformation), a MAC CE, or the physical channel (e.g., SR or PUCCH). For example, the WTRU may include the mapping of QoS to LCG with each report of BSR.

A WTRU may perform such a LCG remapping following the initiation of a new transmission type. For example, a WTRU may initiate a unicast link and may perform remapping of the LCG for broadcast traffic so that one of the LCGs can be reserved for reporting buffer status associated with unicast traffic.

In some situations, a WTRU may report the buffer status for unicast separately from broadcast traffic. Specifically, a WTRU may report BSR for different cast types using any of the following: one or more LCG(s) are predefined or (pre) configured for different cast types; a different BSR format (e.g., different MAC CE) is used for reporting buffer status with different cast type; separate buffer status fields are used in the BSR associated with a logical channel group for reporting separate cast types; and/or a different destination index is used for reporting different cast types.

In one case, a WTRU may report BSR for unicast/groupcast using a destination index from a list of dedicated destination indices reserved for unicast. The WTRU may use a different dedicated destination index for each unicast/groupcast link (e.g., each distinct destination address) that is active at the WTRU. The WTRU may determine the list of dedicated destination indices for unicast/groupcast from: (pre)configuration (e.g., system information, dedicated RRC signaling, pre-configuration); pre-defined for all WTRUs; from another WTRU (e.g., a head or scheduling WTRU); MAC CE or dynamic scheduling (e.g., DCI); in a HO command, during mobility; implicitly, based on a difference in address space between a number of bits configured for the destination index and the number for broadcast destination addresses the WTRU actually needs to refer to (e.g., the WTRU may be configured with a list of destination addresses, services, for broadcast services in UESidelinkInformation message which is length 32, which requires 5 bits, and may be configured with a destination index which is 6 bits wide, where the WTRU may use indices 0-31 or 32-63 for unicast/groupcast destination indices.

A WTRU may increment the destination index within the list of dedicated destination indices for each unicast/groupcast link that is established. Alternatively, the WTRU may send the selected destination index for each unicast/groupcast link established to the network (e.g., at the establishment of the link).

A WTRU may send an indication to the network when additional destination indices are required for unicast links. Such indication may be sent by RRC (e.g., UEAssistanceInformation) or MAC CE.

In some situations a WTRU may report buffer status for LTE and NR RAT separately. Specifically, a WTRU may report buffer status for data to be transmitted over different sidelink RATs (e.g. LTE vs NR) separately. A WTRU may report BSR for different cast types using any of the following: different BRS formats; different LCGs within the same BSR message; and/or, a different destination index within the same BSR message.

Regarding different BSR formats, in one example the WTRU may transmit different LTE BSR and NR BSR MAC CEs. Specifically, this case may assume a model where the same LCG can be assigned for both LTE and NR. The WTRU may be configured with separate QoS to LCG mapping via RRC—for example, for LTE, the WTRU may be configured with a mapping between PPPP and LCG, and for NR, the WTRU may be configured with a mapping between VQI and LCG.

Regarding different LCGs within the same BSR message, this case may assume a model where a LCG can be assigned for either LTE or NR but not both. The WTRU may follow procedures for LCG remapping, as described herein, when it has/does not have data available for one RAT.

Regarding a different destination index within the same BSR message, this case may assume a model where the same LCG can be assigned for both LTE and NR. The WTRU may be configured with separate QoS to LCG mapping via RRC—for example, for LTE, the WTRU may be configured with a mapping between PPPP and LCG, and for NR, the WTRU may be configured with a mapping between VQI and LCG In one case, the WTRU may determine the buffer status for each RAT for flexible data. This may be applicable to the second modeling where a WTRU can move a logical channel from one transmission type to another, and the third modeling where a logical channel can be associated with multiple transmission modes. Specifically, the WTRU may compute the buffer status for each RAT based on the estimated amount of data that will routed over each RAT, as determined from one or more conditions defined herein. Such a calculation of buffer status may be made based on the status of the conditions at the time of BSR calculation. The WTRU may trigger a new BSR when one of the conditions has changed, and/or the amount of data that may be moved from one RAT to another RAT is larger than a threshold.

For example, a WTRU may be configured with a percentage of traffic to be transmitted over each LTE and NR for the traffic, from an upper layer indication, which can be sent over both RATs. This percentage may be defined based on the CBR of the mode 2/mode 4 pool in each of the RATs. At the instant of time in which BSR is to be sent (e.g., based on any BSR trigger), the WTRU may: compute the CBR on LTE and NR, and the corresponding percentage of data to be sent on each RAT; determine the total amount of data to be sent on each RAT based on the data in the WTRU buffers that is configured (e.g., by upper layers) to be sent over a single RAT only, the data that can be sent on either RAT, and the above computed percentage; and/or compute the buffer status for each RAT based on the above.

In one case, there may be prioritization rules between LTE SL BSR and NR SL BSR. specifically, regarding the transmission of different BSR formats for the different RATs, a WTRU may prioritize between transmission of LTE BSR and NR BSR within an UL grant based on any of the following: QoS of the data to be submitted within the BSR (e.g., the WTRU may prioritize transmission of the BSR, LTE or NR, for which higher priority data needs to be reported, wherein the WTRU may prioritize the BSR associated with the RAT for which the WTRU has the logical channel with the highest priority, or, prioritization based on QoS may use the rules for inter-RAT prioritization as discussed herein); size of the BSR (e.g., the WTRU may prioritize transmission of the BSR, LTE or NR, which has the smallest overall size, or may avoid the need to transmit a truncated BSR with the current uplink grant); and/or, a RAT associated with the BSR (e.g., the WTRU may prioritize transmission either LTE RAT or NR RAT).

A WTRU may further be configured by the network to follow certain rules pertaining to the above. For example, the WTRU may be configured by the network with the RAT for which to prioritize BSR transmission (e.g., prioritize LTE BSR over NR BSR).

A WTRU may use a combination of the above rules or may use multiple rules in case a specific rule does not yield an outcome. For example, a WTRU may use the QoS of the data to be submitted, and if both RATs have equal priority data pending, then a WTRU may use size of the BSR.

In one case, a WTRU may determine a destination index for LTE SL and NR SL. This may arise where a destination address may be common among two RATs (e.g., multi-RAT support of the same service), so an approach may be needed to distinguish between buffer status of the service on LTE and NR.

In one example, a WTRU may associate an explicit bit in the destination index in BSR (e.g., RAT indicator bit) to the RAT. Specifically, the full destination index may comprise of a one-bit RAT indicator and x bits destination index, where the destination index may be derived from the index of the destination address in the list of destination addresses in UESidelinkInformation message (e.g., as in LTE).

In another example, the WTRU may associate the destination index for a specific broadcast service on a RAT with one of the indices (e.g., the first index) of that service in the list of carriers/services in UESidelinkInformation, which is associated with a carrier for that RAT. Specifically, the WTRU may be configured with a list of carriers and an association of a RAT for each carrier. In addition, the WTRU may be configured with a list of interested services/destination addresses and the carriers supporting each service/destination address. The WTRU may associate the destination index for a service for LTE to be the first LTE carrier in the list for that service, and the destination for the service on NR to be the first NR carrier on the list for that service.

In another example, the WTRU may associate two related destination indices to each RAT, LTE and NR, when the WTRU determines that a service can be supported by LTE or NR. The relation between destination indices may be any of: use of consecutive destination indices; and/or, use of destination indices that are separate by a number of destination indices in the destination index address space, where the separation may be based on a number of total support destination indices for the WTRU, or a (pre)configured value. For example, the WTRU may determine the services/destination addresses supported by the WTRU that are supported on different RATs. Such a determination may also be made by association of the carrier frequency associated to the service/destination address and the RAT associated with that carrier frequency. The WTRU may assign a single destination index to each service on a given RAT, regardless of the number of carriers supported for that RAT, by incrementing based on the order of services/destination addresses reported to the network in UESidelinkInformation. For a service that the WTRU supports on multiple RATs, the WTRU may assign two consecutive destination indices where the first index is associated with one RAT (e.g., LTE) and the second index is associated with the other RAT (e.g., NR).

In one case, a WTRU may determine truncated BSR when performing LTE SL and NR SL. Specifically, this may be related to reporting LTE and NR buffer status in the same BSR, where a WTRU may determine the contents of a truncated BSR using one or more of the following: the WTRU may prioritize transmission of buffer status of one RAT, potentially predefined or (pre)configured, over another RAT; the WTRU may prioritize transmission of buffer status associated with the highest priority LCG (e.g., assuming separate LCGs are assigned for the different RATs); the WTRU may prioritize transmission of buffer status associated with the highest priority LCG, and for the same LCG for different RATs, the WTRU may prioritize one RAT over another RAT, potentially predefined or (pre)configured, or prioritize the RAT that has data in its buffers having the highest priority between the two RATs (e.g., the WTRU may use any of the rules defined herein for such prioritization).

As noted previously, a WTRU may perform resource selection/reselection based on conditions and/or as part of a data packet handling process (e.g., transmission type).

In some situations, a WTRU may perform selection of the retransmission resource(s) for unicast transmission only following reception of NACK from the peer WTRU(s). Generally, a WTRU may be configured with different resource selection processes for unicast/groupcast and broadcast transmissions. A WTRU may further be configured with different resource selection procedure for unicast/groupcast resource selection and broadcast resource selection. The WTRU may select the retransmission resource(s) using modified parameters for resource selection including, but not limited to: a shorter value of T2 which defines the resource selection window; a different value for the threshold for determination of the availability/unavailability of resources based on a sensing procedure; a different value of the LBT back-off timer, or channel occupancy threshold associated with LBT sensing; a different condition (e.g., number of available resources) for when a WTRU can transmit a preemption indication; a different priority, compared to the actual PPPP/VQI of the packet, compared to the initial transmission; a different number of channels/RBs, where the retransmission resource may use a number of channels/RBs which is a (pre)configured function of the amount of resources for the initial transmission (e.g., the WTRU may provide additional redundancy for the retransmission resources through further encoding, or by transmission of a different RV).

Such modified parameters for resource selection for the retransmission resource may decrease the latency associated with the retransmission resource and/or increase the reliability of the retransmission resource.

In some situations the WTRU may use un-needed retransmission resource for transmission of another sidelink process. Specifically, a WTRU may select both transmission and retransmission resource(s) for unicast transmission at the same time. In the case the WTRU does not require one of the retransmission resources due to an ACK or lack of NACK associated with the initial transmission, the WTRU may utilize the retransmission resource for initial transmission by another sidelink process (e.g., either unicast or broadcast). The WTRU may select the sidelink process that utilizes the unused retransmission resource based on any or a combination of the following criteria: a sidelink process that performs resource (re)selection, potentially for one-shot transmission, at the time when the unused retransmission resource is available; a sidelink process for which the retransmission resource satisfies the timing requirements of the processes initial transmission; and/or, a sidelink process which requires the same number of retransmission resources as available due to the unused number or retransmission resources.

In some situations, a WTRU may use a one-shot-resource selection procedure(s) for retransmission resource selection. Specifically, a WTRU may select the retransmission resource for a forward-booking (e.g., periodic) unicast process using a one-shot resource selection procedure. A WTRU may trigger such a one-shot resource selection procedure following reception of the NACK received from lower layers for a unicast process. Alternatively, the WTRU may, upon reception of the NACK from lower layers, select the retransmission resource from an unused retransmission resource as per the previous solution. Alternatively, a WTRU may choose to not trigger resource selection for a retransmission resource if another unicast process (e.g., associated with the same destination ID) exists which satisfies the timing requirements of the retransmission.

In some situations, a WTRU may use band-specific CQI during resource selection for unicast. Specifically, a WTRU may utilize the results of sidelink CQI associated with a unicast link in the resource selection procedure.

In one example, the WTRU may exclude resources from the resource selection algorithm for which sidelink CQI is below a threshold. Specifically, the WTRU may exclude the resources based on sensing results, and then further exclude the resources for which CQI is below a threshold. The WTRU may then perform random resource selection on the remaining non-excluded resources.

In another example, the WTRU may select the resources with the best CQI from the available resources. Specifically, the WTRU may exclude resources based on sensing results. If the number of available resources is larger than a threshold, the WTRU may select the resources, from the available resources that meet the requirements of the data, having the best/highest SL CQI.

In another example, the WTRU may select the pool of resources or pattern of resources for transmission that has the best average CQI over that pool or pattern of resources.

In some situations, a WTRU may determine a successful resource allocation based on reliability of the data to be transmitted. This may be applicable to both unicast and broadcast resource selection, where a WTRU may determine the required criteria for successful resource selection based on reliability requirement associated with the data to be transmitted. For example, a WTRU may consider a resource selection to be successful if a percentage (x %) of the resources that satisfies the timing requirements of the transmission are determined as available by sensing. A WTRU may be configured to use a different value of x % depending on the WTRU reliability requirement.

A WTRU may further determine the failure instance of a resource selection algorithm based on the reliability requirement. For example, the WTRU may perform multiple attempts of resource selection by increasing the thresholds associated with determining occupancy of resources based on sensing results (e.g., as in LTE). Depending on the reliability, a WTRU may indicate a failed resource selection algorithm following a number of such attempts, where this number may depend on the reliability requirement of the data to be transmitted.

Unsuccessful resource allocation may trigger transmission type change, as discussed herein. It may also trigger preemption or increase in the number of retransmissions by the WTRU.

In some situations, the WTRU may use different carrier selection rules for unicast transmission. Specifically, a WTRU may be configured with different rules for carrier selection associated with unicast transmission compared with broadcast transmission. The motivation behind such rules may be due to the limitations in the number of carriers that can be supported between two WTRUs in unicast (e.g., due to capability).

A WTRU may be configured to perform carrier selection for unicast differently from broadcast using any of the following: a WTRU may be configured with a different CBR threshold for carrier selection associated with unicast compared with broadcast; a WTRU may be configured with a different carrier keeping threshold for carrier selection associated with unicast compared to broadcast; a WTRU may be configured to ignore the CBR threshold for carrier selection (e.g., always use any carrier) for unicast, possibly also when the number of carriers supported for unicast transmission between two WTRUs is below a threshold; and/or, a WTRU may be configured with a different number of allowable sidelink processes depending on the carrier, where a WTRU may be allowed a larger number of sidelink processes on a carrier which is a candidate carrier for transmission of unicast data. Alternatively, a WTRU may be allowed to have only unicast processes on a carrier for which the WTRU is configured with both unicast and broadcast services, possibly under certain criteria (e.g., the number of carriers for unicast is below a threshold, or the CBR on a specific carrier is above/below a threshold).

In some situations, a WTRU may trigger carrier/resource reselection when there is a change of conditions for determining transmission types for a data packet. For example, the WTRU may trigger resource reselection following the decision to move certain logical channels or certain QoS types from mode 2 to mode 1. Additionally/alternatively, the WTRU may trigger resource reselection following the decision to move certain logical channels or certain QoS types from mode 1 to mode 2 due to network coverage restrictions/conditions. Such resource reselection may be performed by the WTRU to replace NW configured resources (e.g., SPS resources) with mode 2 resources.

The situations described herein with regard to carrier/resource (re)selection procedures may be applicable FIG. 3, which shows the example of data handling when a condition changes. Referring to section 313, here carrier/resource reselection may need to occur as a result of the WTRU deciding to change LCH1 from mode 1 to mode 2, since the WTRU is no longer receiving scheduling information for LCH1, the WTRU will need to account for the resources required for LCH1 in its mode 2 resources. Note the added blocks at T2 compared to T1, which represent the added mode 2 resources now required for LCH1.

In some situations, a WTRU may use the amount of mode 1 resources in the resource selection procedure for mode 2. Specifically, a WTRU may determine the amount of resources to select (e.g., periodicity, size, number of one-shot processes, etc.) during a resource selection/reselection based on any of the following: NW indication of NW available; and/or, QoS of the data to transmit. For the NW indication of NW available resources, in one example the NW may enable/disable and SPS resource and the WTRU may perform resource reselection by adding/removing an amount of resources determined by SPS. In another example, the NW may indicate a change in the amount/percentage of mode 1 resources it will provide, and the WTRU may determine the amount of additional mode 2 resources to select based on such indication.

In some situations, a WTRU may determine whether to use mode 1 or mode 2 on a carrier based on CBR. Specifically, a WTRU may perform carrier selection for a sidelink process. If the number of carriers selected by a process is below a threshold (e.g., due to the CBR threshold on that carrier), the WTRU may decide to use mode 1 on other carriers which do not satisfy the CBR threshold.

In another approach, the WTRU may preform resource selection for up to a maximum number of resources on a carrier based on QoS and/or CBR. If a WTRU requires additional resources to satisfy its current buffer requirements, the WTRU may request mode 1 resources to satisfy the remaining resource requirements on that carrier.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

What is claimed:

1. A method implemented by a wireless transmit receive unit (WTRU), the method comprising:
   receiving configuration information, wherein the configuration information comprises a channel-busy-ratio (CBR) threshold related to an association between a logical channel (LCH) and a transmission mode;
   measuring a CBR;
   determining that the measured CBR crosses the CBR threshold;
   triggering a change of the association between the LCH and the transmission mode in response to determining that the measured CBR crosses the CBR threshold; and
   sending a buffer status report (BSR) based on the change in the association between the LCH and the transmission mode.

2. The method of claim 1, further comprising:
   selecting resources for the LCH in response to determining that the measured CBR crosses the CBR threshold; and
   transmitting a message on the selected resources.

3. The method of claim 1, wherein the transmission mode is associated with a network scheduled mode or a WTRU autonomous mode.

4. The method of claim 1, wherein the transmission mode is associated with an indication of unicast, groupcast, or broadcast.

5. The method of claim 1, wherein the transmission mode is associated with a radio access technology (RAT).

6. The method of claim 5, wherein the RAT is LTE or NR.

7. A wireless transmit receive unit (WTRU), the WTRU comprising:
   a transceiver operatively coupled to a processor, the receiver configured to receive configuration information, wherein the configuration information comprises a channel-busy-ratio (CBR) threshold related to an association between a logical channel (LCH) and a transmission mode;
   the transceiver configured to measure a CBR;
   the processor configured to determine that the measured CBR crosses the CBR threshold;
   the transceiver and/or the processor configured to trigger a change of the association between the LCH and the transmission mode in response to the processor determining that the measured CBR crosses the CBR threshold; and
   the transceiver configured to send a buffer status report (BSR) based on the change in the association between the LCH and the transmission mode.

8. The WTRU of claim 7, wherein the transceiver and processor are further configured to:

select resources for the LCH based on the measured CBR exceeding or falling below the CBR threshold; and transmit a message on the selected resources.

9. The WTRU of claim 7, wherein the transmission mode is associated with a network scheduled mode or a WTRU autonomous mode.

10. The WTRU of claim 7, wherein the transmission mode is associated with an indication of unicast, groupcast, or broadcast.

11. The WTRU of claim 7, wherein the transmission mode is associated with a radio access technology (RAT).

12. The WTRU of claim 11, wherein the RAT is LTE or NR.

* * * * *